United States Patent
Minamide et al.

(10) Patent No.: US 12,521,012 B2
(45) Date of Patent: Jan. 13, 2026

(54) MEDICAL SYSTEM AND MEDICAL INFORMATION PROCESSING APPARATUS

(71) Applicants: Topcon Corporation, Tokyo (JP); National University Corporation Asahikawa Medical University, Asahikawa (JP)

(72) Inventors: Kana Minamide, Tokyo (JP); Masahiro Akiba, Wako (JP); Jun Sakai, Kuki (JP); Akitoshi Yoshida, Asahikawa (JP)

(73) Assignees: TOPCON CORPORATION, Tokyo (JP); NATIONAL UNIVERSITY CORPORATION ASAHIKAWA MEDICAL UNIVERSITY, Asahikawa (JP)

( * ) Notice: Subject to any disclaimer, the term of this patent is extended or adjusted under 35 U.S.C. 154(b) by 456 days.

(21) Appl. No.: 18/028,755

(22) PCT Filed: Sep. 21, 2021

(86) PCT No.: PCT/JP2021/034457
§ 371 (c)(1),
(2) Date: Mar. 28, 2023

(87) PCT Pub. No.: WO2022/065264
PCT Pub. Date: Mar. 31, 2022

(65) Prior Publication Data
US 2023/0218165 A1    Jul. 13, 2023

(30) Foreign Application Priority Data
Sep. 28, 2020 (JP) .................. 2020-161990

(51) Int. Cl.
*A61B 3/12* (2006.01)
*A61B 5/026* (2006.01)

(52) U.S. Cl.
CPC ............... *A61B 3/12* (2013.01); *A61B 5/026* (2013.01)

(58) Field of Classification Search
CPC ......... A61B 3/12; A61B 5/026; A61B 5/0022; A61B 5/02007; A61B 5/02035;
(Continued)

(56) References Cited

U.S. PATENT DOCUMENTS

2010/0056936 A1   3/2010  Fujii et al.
2012/0044457 A1   2/2012  Sato et al.
(Continued)

FOREIGN PATENT DOCUMENTS

CN    111428070 A    7/2020
EP    3954271 A1     2/2022
(Continued)

OTHER PUBLICATIONS

International Search Report and Written Opinion mailed on Dec. 14, 2021, received for PCT Application PCT/JP2021/034457, filed on Sep. 21, 2021, 12 pages including English Translation.
(Continued)

*Primary Examiner* — Serkan Akar
(74) *Attorney, Agent, or Firm* — XSENSUS LLP

(57) ABSTRACT

A medical system of an aspect example includes a data acquiring unit and a data processor. The data acquiring unit is configured to acquire data from an eye fundus of a patient using at least one optical method. The data processor is configured to process the data acquired by the data acquiring unit in order to generate information on the circulatory system of the patient.

20 Claims, 13 Drawing Sheets

(58) Field of Classification Search
CPC ... A61B 5/02042; A61B 3/102; A61B 3/1233; A61B 5/0066; A61B 5/0261; A61B 5/7267; A61B 5/7275; G16H 20/00; G16H 40/67; G16H 50/20; G16H 50/30; G16H 50/50

See application file for complete search history.

(56) References Cited

U.S. PATENT DOCUMENTS

| | | |
|---|---|---|
| 2013/0271728 A1 | 10/2013 | Ranchod |
| 2015/0348287 A1 | 12/2015 | Yi et al. |
| 2018/0242844 A1 | 8/2018 | Liu et al. |
| 2018/0289252 A1 | 10/2018 | Garnavi et al. |
| 2018/0289253 A1 | 10/2018 | Harris et al. |
| 2018/0360307 A1 | 12/2018 | Oh et al. |
| 2019/0090732 A1 | 3/2019 | Oyagi et al. |
| 2019/0272631 A1 | 9/2019 | Shemonski et al. |
| 2020/0085290 A1 | 3/2020 | Wang et al. |
| 2020/0085292 A1 | 3/2020 | Fukuma et al. |
| 2021/0038075 A1 | 2/2021 | Sakai et al. |
| 2022/0039654 A1 | 2/2022 | Fitzgibbons et al. |
| 2023/0000342 A1 | 1/2023 | Fukuma et al. |

FOREIGN PATENT DOCUMENTS

| | | |
|---|---|---|
| JP | 2002-153487 A | 5/2002 |
| JP | 2014-226156 A | 12/2014 |
| JP | 2016-123605 A | 7/2016 |
| JP | 2019-054994 A | 4/2019 |
| JP | 2019-058495 A | 4/2019 |
| JP | 2019-154988 A | 9/2019 |
| JP | 2019-213734 A | 12/2019 |
| JP | 2020-044027 A | 3/2020 |
| JP | 2020-048730 A | 4/2020 |
| WO | 1997038691 A1 | 10/1997 |
| WO | 2008/069062 A1 | 6/2008 |
| WO | 2017027383 A1 | 2/2017 |

OTHER PUBLICATIONS

Tadakazu Chung, "Is disseminated intravascular coagulation (DIC) involved in deaths caused by novel coronavirus pneumonia?", Webiji Shimpo, May 9, 2020, pp. 1-3 (6 pages including English Translation).

Asako Matsushima, "Many severe COVID-19 patients are inferred to be suffering from sepsis", Webiji Shimpo, May 16, 2020, pp. 1-3 (6 pages including English Translation).

"Manual for serious side effects by disease: Disseminated Intravascular Coagulation (systemic hypercoagulopathy, consumption coagulopathy)", Ministry of Health, Labour and Welfare, Jun. 2007, pp. 1-19 (40 pages including English Translation).

"COVID-19 and Coagulopathy: Frequently Asked Questions", Feb. 2, 2022, 6 pages.

"Guideline for clinical practice of novel coronavirus disease 2020 19-COVID 2nd edition", 2020, pp. 1-32 (64 pages Including English Translation).

Nagaoka et al., "Noninvasive Evaluation of Wall Shear Stress on Retinal Microcirculation in Humans", Investigative Ophthalmology & Visual Science, vol. 47, No. 3, Mar. 2006, pp. 1113-1119.

Condon et al., "Appearance of an erythrocyte population with decreased deformability and hemoglobin content following sepsis", Am J Physiol Heart Circ Physiol., vol. 284, 2003, pp. H2177-H2184.

Reneman et al., "Wall shear stress as measured in vivo: consequences for the design of the arterial system", Med Biol Eng Comput, vol. 46, International Federation for Medical and Biological Engineering, 2008, pp. 499-507.

Extended European Search Report issued Sep. 3, 2024, in corresponding European Patent Application No. 21872393.0, 12pp.

Japanese Office Action issued Nov. 26, 2024, in corresponding Japanese Patent Application No. 2020-161990, 23pp.

Japanese Office Action issued Mar. 25, 2025, in corresponding Japanese Patent Application No. 2020-161990, 12pp.

MEDICAL SYSTEM AND MEDICAL INFORMATION PROCESSING APPARATUS

CROSS-REFERENCE TO RELATED APPLICATIONS

This application is a national stage (under 35 U.S.C. 371) of International Patent Application No. PCT/JP2021/034457, filed Sep. 21, 2021, claiming priority to Japanese Patent Application No. 2020-161990, filed Sep. 28, 2020, both of which are herein incorporated by reference in their entirety.

FIELD

The present disclosure relates to a medical system and a medical information processing apparatus.

BACKGROUND

Symptoms of a disease and signs of aggravation (exacerbation, worsening) of a disease are complex, and various techniques and technologies have been developed to detect them. For example, Patent Document 1 below discloses, as a technique and technology for determining the risk of infection without using advanced medical knowledge, a technique and technology for determining the risk on the basis of the presence or absence of abnormalities in arterial blood oxygen saturation, body temperature, and heart rate.

[PATENT DOCUMENT 1] Japanese Unexamined Patent Application Publication No. 2016-123605

One object of the present disclosure is to provide a novel technique and technology for detecting a state (condition) of the circulatory system of a patient in a non-invasive manner.

A medical system according to some aspect examples includes a data acquiring unit and a data processor. The data acquiring unit is configured to acquire data from an eye fundus of a patient using at least one optical method. The data processor is configured to process the data acquired by the data acquiring unit in order to generate information on a circulatory system of the patient.

According to some aspect examples, the information on the circulatory system includes information on thrombophilia.

According to some aspect examples, the information on the thrombophilia includes information on a blood characteristic.

According to some aspect examples, the information on the blood characteristic includes information that represents a change in the blood characteristic caused by sthenia of a blood coagulation and fibrinolytic system.

According to some aspect examples, the information on the circulatory system includes information on a thrombus symptom.

According to some aspect examples, the information on the thrombus symptom includes information that represents a distribution of blood flow velocity in a blood vessel.

According to some aspect examples, the information on the thrombus symptom includes information on an object formed in a blood vessel.

According to some aspect examples, the information on the circulatory system includes information on a state (condition) of the circulatory system that accompanies an infectious disease.

According to some aspect examples, the information on the circulatory system includes at least one of information that represents a state (condition) related to sepsis, information that represents a state (condition) related to disseminated intravascular coagulation (DIC), information that represents a state (condition) related to thrombus, and information that represents a state (condition) related to vascular occlusion.

According to some aspect examples, the at least one optical method includes at least one of optical coherence tomography blood flow measurement (OCT blood flow measurement), optical coherence tomography angiography (OCT-A), and color fundus photography.

According to some aspect examples, the at least one optical method includes the OCT blood flow measurement, and the data processor is configured to generate information on a blood coagulation and fibrinolytic system based at least on blood flow data acquired by the OCT blood flow measurement.

According to some aspect examples, the data acquiring unit includes an OCT apparatus and a calculator. The OCT apparatus is configured to collect data by applying optical coherence tomography (OCT) scanning to the eye fundus. The calculator is configured to calculate blood flow velocity and blood vessel diameter based at least on the data collected by the OCT apparatus. In addition, the data processor is configured to generate information on the blood coagulation and fibrinolytic system based at least on the blood flow velocity and the blood vessel diameter calculated by the calculator.

According to some aspect examples, the data processor includes a WSR calculator configured to calculate a wall shear rate (WSR) based at least on the blood flow velocity and the blood vessel diameter.

According to some aspect examples, the data processor further includes a memory and a WSS calculator. The memory stores blood viscosity information acquired in advance. The WSS calculator is configured to calculate wall shear stress (WSS) based at least on the wall shear rate and the blood viscosity information.

According to some aspect examples, the data acquiring unit includes an OCT apparatus and a blood flow information generator. The OCT apparatus is configured to collect time series data by repetitively applying OCT scanning to a predetermined region of the eye fundus. The blood flow information generator is configured to generate blood flow information that represents a spatial distribution of and a temporal change in blood flow velocity based at least on the time series data collected by the OCT apparatus. In addition, the data processor is configured to generate information on the blood coagulation and fibrinolytic system based at least on the blood flow information generated by the blood flow information generator.

According to some aspect examples, the data processor is configured to generate information on an object formed in a blood vessel based at least on the blood flow information.

According to some aspect examples, the data processor includes a WSR information generator configured to generate WSR information that represents a spatial distribution of and a temporal change in a wall shear rate (WSR) based at least on the blood flow information.

According to some aspect examples, the data processor is configured to generate information on an object formed in a blood vessel based at least on the blood flow information and the WSR information.

According to some aspect examples, the data processor further includes a memory and a WSS information generator. The memory stores blood viscosity distribution information acquired in advance. The WSS information generator is configured to generate WSS information that represents a spatial distribution of and a temporal change in a wall shear stress (WSS) based at least on the WSR information and the blood viscosity distribution information.

According to some aspect examples, the data processor is configured to generate information on an object formed in a blood vessel based at least on the blood flow information and the WSS information.

According to some aspect examples, the data processor includes a first inference processor. The first inference processor is configured to execute inference processing using a first learned model. The first learned model is constructed by machine learning with first training data including first data acquired from an eye fundus using the at least one optical method and diagnosis result data. The first inference processor is configured to receive the data acquired from the eye fundus of the patient by the data acquiring unit and output the information on the circulatory system of the patient.

According to some aspect examples, the data processor includes a second inference processor. The second inference processor is configured to execute inference processing using a second learned model. The second learned model is constructed by machine learning with second training data including second data generated by processing first data acquired from an eye fundus using the at least one optical method and diagnosis result data. The second inference processor is configured to receive data generated by processing the data acquired from the eye fundus of the patient by the data acquiring unit and output the information on the circulatory system of the patient.

The medical system according to some aspect examples further includes a transmitter. The transmitter is configured to transmit the information on the circulatory system generated by the data processor to a doctor's computer terminal located at a place remote from the data acquiring unit.

The medical system according to some aspect examples further includes the doctor's computer terminal.

The medical system according to some aspect examples further includes an operation device used to perform a remote operation of the data acquiring unit.

A medical information processing apparatus according to some aspect examples includes a data receiver and a data processor. The data receiver is configured to receive data acquired from an eye fundus of a patient using at least one optical method. The data processor is configured to process the data received by the data receiver in order to generate information on the circulatory system of the patient.

The medical information processing apparatus according to some aspect examples further includes a first transmitter. The first transmitter is configured to transmit the information on the circulatory system generated by the data processor to a doctors computer terminal located at a place remote from a place where the data is acquired.

A medical system according to some aspect examples includes the medical information processing apparatus according to a certain aspect example and the doctor's computer terminal.

The medical system according to some aspect examples further includes a data acquiring apparatus and a second transmitter. The data acquiring apparatus is configured to acquire data from the eye fundus of the patient using the at least one optical method. The second transmitter is configured to transmit the data acquired by the data acquiring apparatus to the medical information processing apparatus. In addition, the data receiver is configured to receive the data transmitted by the second transmitter. Furthermore, the data processor is configured to process the data transmitted by the second transmitter and received by the data receiver in order to generate the information on the circulatory system of the patient.

The aspect examples according to the present disclosure are capable of providing a novel technique and technology for non-invasively detecting a state (condition) of the circulatory system of a patient.

DETAILED DESCRIPTION

Figure 1:
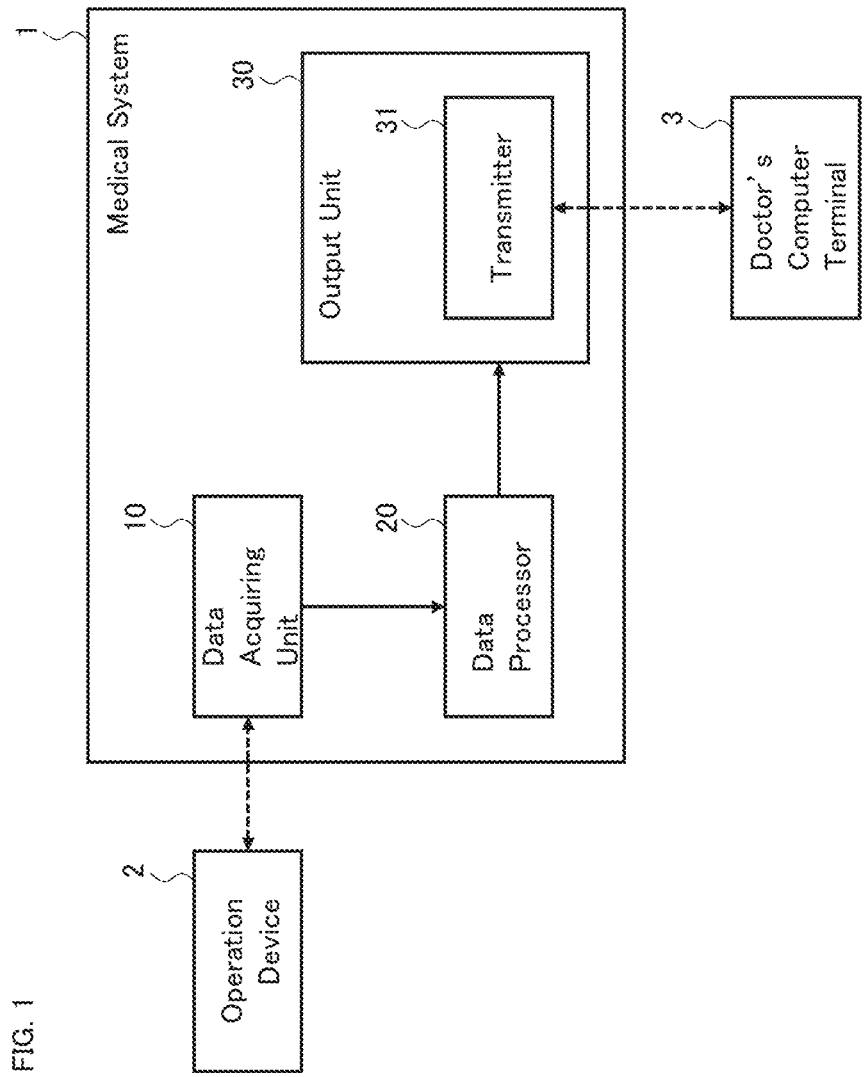
FIG. 1 is a diagram illustrating an example of a configuration of a medical system according to an aspect example.

The present disclosure describes several aspect examples of a medical system and a medical information processing apparatus. A person having ordinary skill in the art will appreciate that the aspects according to the present disclosure can provide various kinds of modifications, variations, and equivalents, and that the aspects according to the present disclosure, or their modifications, variations, or equivalents can provide various kinds of other aspects such as a medical method, a method of controlling a system, a method of controlling an apparatus or a device, a program, a recording medium, and so forth.

Some aspect examples are configured to use a computer to generate information on the circulatory system of a patient by processing data acquired from the eye fundus of the patient by means of at least one optical method (optical technique, optical modality). This computer processing may include a process of inference. The inference may be performed by, for example, an algorithm using a learned model (inference model) constructed by machine learning, an algorithm not using a learned model, or a combination of these two algorithms.

Data to be subjected to computer processing in some aspect examples may be data acquired in any ophthalmic examination, such as data acquired using any ophthalmic modality apparatus or device. The ophthalmic modality apparatus or device may be, for example, an optical coherence tomography (OCT) apparatus, a fundus camera, a scanning laser ophthalmoscope, a slit lamp microscope, a surgical microscope, or the like. In some aspect examples, an OCT apparatus is employed, for example, for optical coherence tomography blood flow measurement, optical coherence tomography angiography (OCT-A), and so forth. In some aspect examples, a fundus imaging device, such as a fundus camera, a scanning laser ophthalmoscope, a slit lamp microscope, a surgical microscope, etc., is used for color fundus photography, for example. Data to be subjected to computer processing is not limited to these examples, and may further include, for example, other types of examination data, electronic medical record data, medical interview data (health interview data, medical consultation data), patient's background information (e.g., age, treatment history, medical history, health history, medication history, surgical history, etc.), or other types of medical information.

The aspect examples are configured to generate a predetermined type of information on the circulatory system of the patient from the data described above. Information generated by some aspect examples may include at least one of quantitative information and qualitative information. For example, the information generated by some aspect examples may include any of the following kinds of information: information on thrombophilia; information on a thrombus symptom; information on a state (condition) of the circulatory system accompanying (associated with) an infectious disease; information representing a state related to sepsis; information representing a state related to disseminated intravascular coagulation (DIC): information representing a state related to a thrombus; and information representing a state related to vascular occlusion.

The information on the thrombophilia is information that represents a tendency for a thrombus (blood clot) to form in the circulatory system (in the blood vessels, in the heart) of the patient, and includes, for example, information on the risk of thrombus formation. The information on the thrombophilia may include any one of or both information on a blood characteristic (blood condition, blood state) and information that represents a change in a blood characteristic caused by sthenia (accentuation) of the blood coagulation and fibrinolytic system. The information on the blood characteristic includes information on a property of blood and/or information on a state of blood. The information that represents the change in the blood characteristic caused by the sthenia of the blood coagulation and fibrinolytic system includes any one of or both information that represents a change in a blood characteristic caused by activation of a system that coagulates the blood (a coagulation system, a blood coagulation factor), and information that represents a change in a blood characteristic caused by activation of a system that dissolves a thrombus and a blood clot (a fibrinolytic system). The information on the thrombophilia may include, for example, viscosity, wall shear stress, a wall shear rate, an amount or ratio of a specific component, a ratio between specific components, information that represents a change in any of these items, information that represents a distribution of any of these items, or other types of information.

The information on the thrombus symptom is information on a symptom caused by a thrombus, and may include, for example, any one of or both information that represents a distribution of blood flow velocity in a blood vessel and information on an object formed in a blood vessel (an intravascular formation). The distribution of the blood flow velocity in the blood vessel may be, for example, any one of a one dimensional distribution, a two dimensional distribution, a three dimensional distribution, and a temporal distribution, or a combination of any two or more of these distributions. The object formed in the blood vessel (the intravascular formation) may be, for example, any one or more of a white thrombus, a red thrombus, a mixed thrombus, a hyaline thrombus, and those involved in the formation mechanism of any of these thrombi (e.g., intermediate products).

The information on the state of the circulatory system accompanying the infectious disease includes information on a disease and/or a disease state (a disease condition) that accompany/accompanies or are/is caused by the infectious disease. Examples of such information include information on any one or more of vascular inflammation, thrombophilia, blood coagulation tendency (clotting tendency), sepsis, DIC, pneumonia, lymphadenitis, lymphangitis, and other diseases and disease states. The infectious disease of interest may be any viral infection, any bacterial infection, or any fungal infection, such as the pandemic in 2020 of the novel coronavirus infection (Coronavirus Disease 2019: COVID-19), severe acute respiratory syndrome (SARS), Middle East respiratory syndrome (MERS), influenza, infective endocarditis, or other infectious diseases.

Sepsis is a very serious condition caused by the spread of an infection throughout the body, resulting in circulatory shock, DIC, multiple organ failure (multiple organ dysfunction syndrome (MODS)), and so forth. The information representing the state related to sepsis includes, for example, information related to symptoms such as inflammation and circulatory failure caused by sepsis.

DIC is a syndrome in which a blood coagulation reaction, which should normally occur only at a site of bleeding, occurs chaotically in blood vessels throughout the body. As a pathological condition of DIC, significant coagulation activation occurs continuously in blood vessels throughout the body, resulting in frequent occurrence of microthrombi. As DIC progresses, organ damage caused by microcirculatory disorder (microcirculatory disturbance) leads to consumption coagulopathy (consumptive coagulopathy), resulting in bleeding. In addition, fibrinolytic activation occurs along with coagulation activation, resulting in excessive fibrinolysis of thrombi, which promotes hemorrhage. The information representing the state related to disseminated intravascular coagulation (DIC) includes, for example, information representing any one or more of the above-described pathological conditions of DIC (i.e., sthenia of the coagulation system, sthenia of the fibrinolytic system, thrombi, bleeding or hemorrhage, and other conditions).

The information representing the state related to a thrombus may be any type of information related to a thrombus that exists or may exist in the circulatory system (in a blood vessel, in the heart). Such information includes, for example, the presence or absence of a thrombus, the degree of a thrombus, a distribution of thrombi, the number of thrombi, the probability that a thrombus is forming or has formed, or other types of information.

The information representing the state related to vascular occlusion may be any type of information regarding vascular occlusion that has occurred (or is occurring) or is likely to occur (or is likely to be occurring) in the circulatory system. Such information includes, for example, the presence or absence of vascular occlusion, the degree of vascular occlusion, a distribution of vascular occlusion locations (sites, points), the number of vascular occlusion locations, the probability that vascular occlusion is occurring (or has occurred), or other types of information.

As described above, the aspect examples are configured to make it possible to detect the state of the circulatory system of the patient in a non-invasive manner, for example, by generating information on the circulatory system of the patient on the basis of data acquired from the eye fundus of the patient using any of the optical modalities shown in the above examples. Some aspect examples may be configured to generate information related to one or more matters and items among the following options: thrombophilia (e.g., a blood characteristic and/or a change in a blood characteristic caused by sthenia of the blood coagulation and fibrinolytic system); a thrombus symptom (e.g., a blood flow velocity distribution and/or an intravascular formation); a state and/or a state change of the circulatory system accompanying an infectious disease; sepsis; DIC; thrombus; vascular occlusion; matters and items similar to any of these; matters and items derived from any of these; and matters and items related to mechanisms of any of these. It should be noted that the types of information that can be generated by the aspect examples are not limited to these, but can be any type of information that can be generated (e.g., derived, estimated, etc.) by a combination of an optical modality employed and a data processing employed.

Several aspect examples have been devised also in consideration of the background as described below, and can achieve corresponding advantageous effects. Healthcare workers such as doctors and nurses are exposed to the risk of in-hospital infection (healthcare-associated infection). For example, during the pandemic of the novel coronavirus infection (COVID-19) in 2020, the risk of infection to healthcare workers became one of major problems, as cluster infections occurred at medical institutions that were crowded with patients. The increased risk of infection to healthcare workers can occur not only during epidemics of infectious diseases, but also in the event of disasters or major accidents. In general, it is considered important to ensure a sufficient distance between people (what is referred to as social distancing) to reduce the risk of infection. However, it is not easy to keep adequate social distances in standard clinical environment. For example, when conducting an examination, the doctor or other healthcare workers are often in close proximity to the patient to carry out the procedure.

Some aspect examples may be configured to be capable of providing information generated by applying computer processing to data acquired by means of an optical modality, to a doctor's computer terminal that is located at a remote place. Further, some aspect examples may be configured to be capable of performing an operation or manipulation of an examination apparatus (optical modality apparatus) and a computer from a place located remotely. These configurations make it possible to realize utilization, for a diagnostic purpose, of data acquired by examinations that could not previously be performed without being in close proximity to a patient. In other words, according to some aspect examples, it becomes possible to maintain social distances between patients and healthcare workers, and also to achieve detection of complex physiological events, such as symptoms and aggravation signs, in a non-invasive manner with high precision.

Here, being "located remotely" may be any positional relationship that can keep social distances between patients and healthcare workers. For example, the doctor's computer terminal may be located in a room separate from a room in which the examination apparatus is located, or may be located in a facility separate from a facility in which the examination apparatus is located. In addition, an apparatus or a device (e.g., an operation device, an operation unit) for conducting a remote operation of the examination apparatus may be located in a room separate from a room in which the examination apparatus is located, or may be located in a facility separate from a facility in which the examination apparatus is located. It should be noted that in the cases where an examination is conducted under an adequate infection protection system, such as when full protective clothing is worn, it is not necessary to ensure social distancing.

Modifications may be made to any of the aspect examples in the present disclosure by any of the matters and items described in the documents cited herein and any other known techniques or technologies. This modification may be, for example, any of addition, combination, substitution, replacement, deletion, omission, and other processing.

At least one or more of the functions of the elements described in the present disclosure may be implemented by using a circuit configuration (circuitry) or a processing circuit configuration (processing circuitry). The circuitry or the processing circuitry may include any of the followings, all of which are configured and/or programmed to execute at least one or more functions disclosed herein: a general purpose processor, a dedicated processor, an integrated circuit, a central processing unit (CPU), a graphics processing unit (GPU), an application specific integrated circuit (ASIC), a programmable logic device (e.g., a simple programmable logic device (SPLD), a complex programmable logic device (CPLD), or a field programmable gate array (FPGA)), an existing or conventional circuit configuration or circuitry, and any combination of these. A processor may be considered to be processing circuitry or circuitry that includes a transistor and/or another circuitry. In the present disclosure, circuitry, a circuit, a computer, a processor, a unit, a means, a part, a section, or a term similar to these may include hardware that executes at least one or more functions disclosed herein, and/or hardware that is programmed to execute at least one or more functions disclosed herein. Hardware may be the hardware disclosed herein, or alternatively, known hardware that is programmed and/or configured to execute at least one or more functions described herein. In the case in which the hardware is a processor, which may be considered as a certain type of circuitry, then circuitry, a circuit, a computer, a processor, a unit, a means, a part, a section, or a term similar to these may be a combination of hardware and software. In this case, the software may be used to configure the hardware and/or the processor.

The aspect examples described below may be freely combined. For example, two or more of the aspect examples may be combined at least in part.

<Configuration of Medical System>

Several examples of a configuration of a medical system of some aspect examples will be described. The medical system 1 illustrated in FIG. 1 includes the data acquiring unit 10, the data processor 20, and the output unit 30. The medical system 1 may further include the operation device 2.

In some typical examples, the data acquiring unit 10 and the data processor 20 are connected via a communication line. This communication line may form a network in a medical institution, or may form a network across a plurality of facilities. The communication technology applied to this communication line may be freely determined, and may include any of various kinds of known communication technologies such as wired communication, wireless communication, near field communication, and so forth. The connection mode between the data processor 20 and the output unit 30 may be the same. Alternatively, the data processor 20 and the output unit 30 may be functional parts equipped with the same computer.

The operation device 2 is used by a healthcare worker to perform a remote operation of the data acquiring unit 10 (e.g., an examination apparatus, an optical modality apparatus). The operation device 2 is also used by a healthcare worker (examiner) to provide an instruction and so forth to a patient (examinee) who is undergoing a medical examination using the data acquiring unit 10. The operation device 2 may also be usable to perform a remote operation of the data processor 20. The operation device 2 includes, for example, a computer, an operation panel, and other parts.

The data acquiring unit 10 is configured to acquire data from the eye fundus of the patient by means of at least one optical modality. The data acquiring unit 10 includes any optical fundus imaging modality device, such as an optical coherence tomography apparatus, a fundus camera, a scanning laser ophthalmoscope, a slit lamp microscope, a surgical microscope, for example. The data acquiring unit 10 may be capable of further acquiring, for example, other types of examination data, electronic medical record data, medical interview data, patient's background information, and so forth.

The optical coherence tomography apparatus and/or the fundus camera may be, for example, apparatuses in which various kinds of imaging preparation operations are automated, as described in Japanese Unexamined Patent Application Publication No. 2020-44027. Note that the imaging preparation operations are performed to prepare imaging conditions. Examples of the imaging preparation operations include alignment adjustment, focus adjustment (focusing), optical path length adjustment, polarization adjustment, and light amount adjustment. Further, the optical coherence tomography apparatus and/or the fundus camera may be configured to perform an automatic operation for maintaining favorable imaging conditions achieved by the imaging preparation operations. Examples of the automatic operation include automatic alignment adjustment in accordance with an eye movement (eye tracking), automatic optical path length adjustment in accordance with an eye movement (Z lock), and so forth. These automatic operations are effective, for example, in examinations conducted without the presence of an examiner.

Data acquired by the optical coherence tomography apparatus (optical coherence tomography data) may include at least one of the following kinds of data, for example: three dimensional image data obtained by applying a three dimensional scan to the eye fundus; projection image data of three dimensional image data; optical coherence tomography angiography image data; and optical coherence tomography blood flow data.

Optical coherence tomography angiography is an optical modality that visualizes blood vessels using a motion contrast technique, and is capable of visualizing minute blood vessels. Optical coherence tomography angiography image data is acquired using an optical coherence tomography apparatus as that described, for example, in Japanese Unexamined Patent Application Publication No. 2019-58495 or Japanese Unexamined Patent Application Publication No. 2019-154988.

Optical coherence tomography blood flow measurement is an optical modality that measures the state of blood circulation (blood flow dynamics). Optical coherence tomography blood flow data is obtained, for example, using an optical coherence tomography apparatus as that described in Japanese Unexamined Patent Application Publication No. 2019-54994 and in Japanese Unexamined Patent Application Publication No. 2020-48730. Some aspect examples may be capable of acquiring, by means of the optical coherence tomography blood flow measurement, any of the following kinds of data as optical coherence tomography blood flow data: blood flow velocity data; blood flow rate data (blood flow amount data); blood vessel diameter data; waveform data that represents a time series change (a time change, a time dependent change) in blood flow velocity; waveform data that represents a time series change in blood flow rate; and other kinds of data. Such waveform data is typically a time series change graph of blood flow velocity represented by a two dimensional coordinate system with time as the horizontal axis and blood flow velocity as the vertical axis. The optical modality used for fundus blood flow measurement is not limited to the optical coherence tomography blood flow measurement, but may also be a laser speckle flowgraphy (LSFG), for example, as that described in Domestic Re-publication of PCT International Publication No. 2008/069062.

Image data that can be acquired by a fundus camera (referred to as fundus camera image data) includes, for example, any one or more of color fundus image data, infrared fundus image data, fluorescent contrast fundus image data (fluorescein angiography image data, indocyanine green angiography image data, etc.), and so forth. In some aspect examples, a fundus camera is used to acquire color fundus image data.

A scanning laser ophthalmoscope may be, for example, an apparatus as that described in Japanese Unexamined Patent Application Publication No. 2014-226156. Image data that can be acquired by a scanning laser ophthalmoscope (referred to as scanning laser image data) includes, for example, any one or more of color fundus image data, monochrome fundus image data, fluorescent contrast fundus image data, and so forth. In some aspect examples, a scanning laser ophthalmoscope is used to acquire color fundus image data.

A slit lamp microscope may be, for example, an apparatus usable for remote imaging, as that described in Japanese Unexamined Patent Application Publication No. 2019-213734. Image data acquired by the slit lamp microscope may be, for example, any one or more of color fundus image data, anterior eye segment cross sectional image data, and anterior eye segment three dimensional image data. In some aspect examples, a slit lamp microscope is used to acquire color fundus image data.

A surgical microscope may be, for example, an apparatus usable for remote surgery, as that described in Japanese Unexamined Patent Application Publication No. 2002-153487. In some aspect examples, a surgical microscope is used to acquire color fundus image data.

In the present aspect, at least one of the examination apparatuses included in the data acquiring unit 10 (e.g., the optical coherence tomography apparatus, the fundus camera, etc.) may be capable of performing remote operations and/or remote controls.

For example, considering the risk of infection to healthcare workers, separate rooms for examination and operation can be prepared as an examination room and an operation room. Here, the examination room is used for conducting an examination using an examination apparatus, and the operation room is used for performing an operation of the examination apparatus. In addition to the examination apparatus, the examination room may be equipped with any of the following types of devices: a speaker and/or a display to output an instruction issued by an operator from the operation room (e.g., voice, image, video, etc.), a video camera to photograph a subject (patient) in the examination room, a microphone to input voice of the subject, and a computer connected to the examination apparatus.

On the other hand, the operation room is equipped with the operation device 2 used for performing remote operation of the examination apparatus. The operation device 2 includes any one or more of a computer, an operation panel, a display, a video camera, and a microphone. The computer executes processing for remote control. The computer is connected to the examination apparatus installed in the examination room. The operation panel, the video camera, and the microphone are used to input an instruction for the subject. The display shows visualization of data acquired by the examination apparatus, visualization of information for remote operation (e.g., a screen, information from the examination room, etc.), and so forth.

With such configurations, the operator (healthcare worker) can conduct remote operation, from the operation room, of the examination apparatus located in the examination room using an application programming interface (API), for example. The operator can also send an instruction from the operation room to the subject by the use of a videophone. As a result, the subject can undergo an examination by him/herself in accordance with the instruction issued by the operator at a remote location. This makes it possible to significantly reduce the risk of the operator getting an infection from the subject.

In order to more preferably conduct an examination carried out by a patient (subject) by him/herself, the above-mentioned examination apparatus with automated preparation operations may be used. In this case, it is conceivable that an examination can be performed without requiring an instruction from an operator. In some cases, no assistant (such as an operator) may be prepared. However, some patients may find it difficult to perform an examination alone. Therefore, the following measures may be taken, for example: an assistant may be arranged on standby at a remote location, or an assistant may be arranged to monitor the status, state, condition, situation, or the like of an examination from a remote location. The assistant (e.g., operator, etc.) who sends an instruction to the patient may be a personified computer system or an anthropomorphic computer system. A typical example of such computer systems is an automatic response system configured by using artificial intelligence technology.

The data processor 20 executes various kinds of data processing. The data processor 20 of the present aspect example is configured to process data acquired by the data acquiring unit 10 in order to generate information on the circulatory system of the patient.

The information generated by the data processor 20 of the present aspect example may include, for example, at least one of the following kinds of information: information on thrombophilia (information on blood characteristic, and/or information representing a change in a blood characteristic caused by sthenia of a blood coagulation and fibrinolytic system); information on a thrombus symptom (a method representing a distribution of blood flow velocity in a blood vessel, and/or information on an object formed in a blood vessel (an intravascular formation)); information on the state (and/or a change in the state) of the circulatory system accompanying an infectious disease; information representing the state related to sepsis; information representing the state related to DIC; information representing the state related to a thrombus; and information representing the state related to vascular occlusion.

Several examples of the processing performed by the data processor 20 are described in aspect examples below. The data processor 20 may or may not use a learned model (inference model) constructed by using machine learning.

Figure 2:
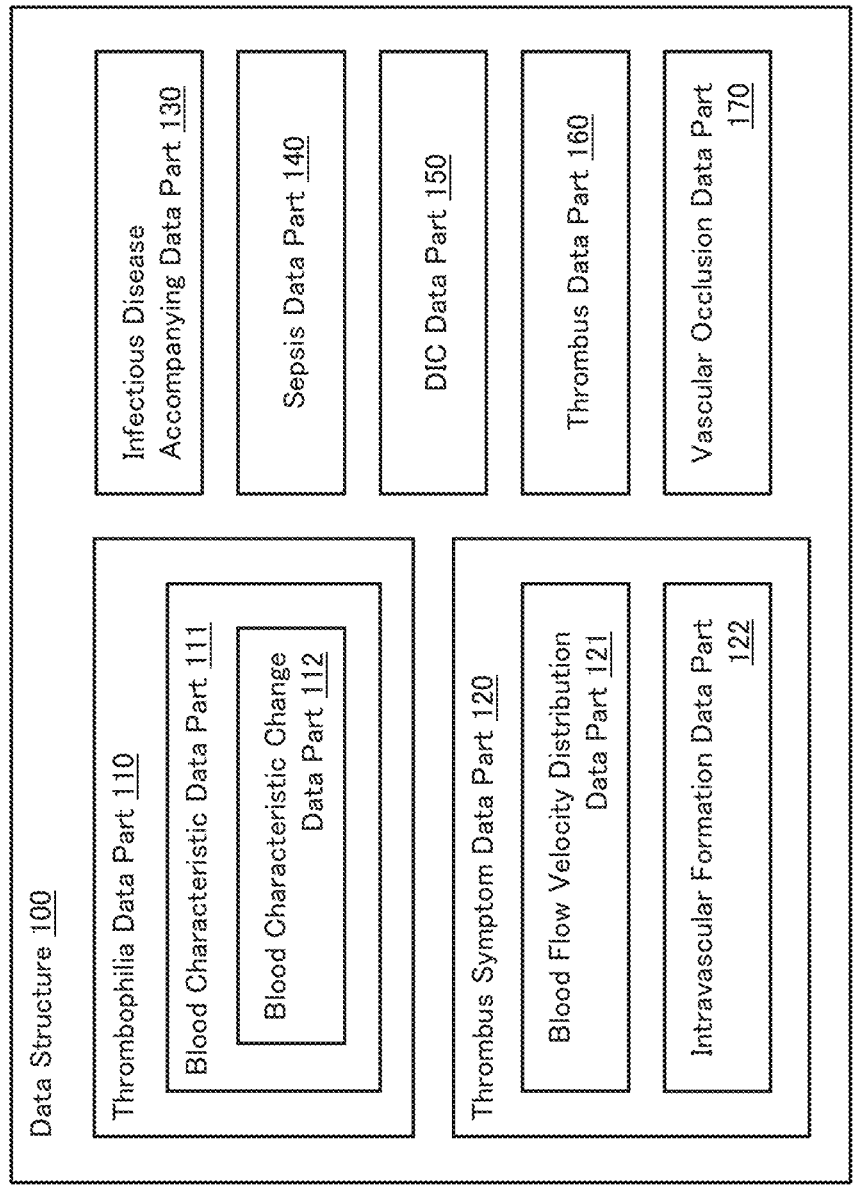
FIG. 2 is a diagram illustrating an example of a structure of data to be processed by a medical system according to an aspect example.

FIG. 2 shows an example of a data structure that can be employed for processing (e.g., recording, transmitting, or other types of processing) data generated by the data processor 20. The data structure 100 of the present example includes the thrombophilia data part 110, the thrombus symptom data part 120, the infectious disease accompanying data part 130, the sepsis data part 140, the DIC data part 150, the thrombus data part 160, and the vascular occlusion data part 170.

The thrombophilia data part 110 is a region (e.g., folder, directory) in which information on thrombophilia generated by the data processor 20 is recorded. The thrombophilia data part 110 includes the blood characteristic data part 111. The blood characteristic data part 111 is a region in which information on a blood characteristic generated by the data processor 20 is recorded. The blood characteristic data part 111 includes the blood characteristic change data part 112. The blood characteristic change data part 112 is a region in which information representing a change in a blood characteristic caused by sthenia of a blood coagulation and fibrinolytic system generated by the data processor 20 is recorded.

The thrombus symptom data part 120 is a region in which information on a thrombus symptom generated by the data processor 20 is recorded. The thrombus symptom data part 120 includes the blood flow velocity distribution data part 121 and the intravascular formation data part 122. The blood flow velocity distribution data part 121 is a region in which information representing a distribution of blood flow velocity in a blood vessel generated by the data processor 20 is recorded. The intravascular formation data part 122 is a region in which information on an object formed in a blood vessel (intravascular formation) generated by the data processor 20 is recorded.

The infectious disease accompanying data part 130 is a region in which information on a state of a circulatory system accompanying infectious diseases generated by the data processor 20 is recorded. The sepsis data part 140 is a region in which information representing a state related to sepsis generated by the data processor 20 is recorded. The DIC data part 150 is a region in which information representing a state related to DIC generated by the data processor 20 is recorded. The thrombus data part 160 is a region in which information representing a state related to a thrombus generated by the data processor 20 is recorded. The vascular occlusion data part 170 is a region in which information representing a state related to vascular occlusion generated by the data processor 20 is recorded.

In some aspect examples, the data structure 100 includes at least one of the data parts 110 to 170 described above. In some aspect examples, the data structure 100 may include one or more data parts other than the data parts 110 to 170 described above. The data structure 100 of some examples may include any one or more of an eye fundus data part, a processed data part, freely selected data part, and data parts of other types. Here, the eye fundus data part is a region in which data acquired from an eye fundus by the data acquiring unit 10 is recorded, the processed data part is a region in which data obtained by applying predetermined processing to data acquired from an eye fundus by the data acquiring unit 10 is recorded, and the freely selected data part is a region in which freely selected or determined types of data is recorded. The freely selected data part records, for example, data acquired by any types of examination apparatuses, electronic medical record data, medical interview data, patient information (e.g., patient identifier, patient's background information), and so forth.

Some background of the present aspect example configured to generate these pieces of data will be described. The article "Is disseminated intravascular coagulation (DIC) involved in deaths caused by novel coronavirus pneumonia?" (Japan Medical Journal website: https://www.jmedj.co.jp/journal/paper/detail.php?id=14500) presents the following possibilities and observations: DIC (thromboembolism caused by DIC) induced by novel coronavirus infection (COVID-19) may be one of the causes of death from severe novel coronavirus pneumonia; myocarditis may also occur; there is not much information on the formation of a thrombus in the heart and in deep veins because echocardiography and vascular ultrasound, which are performed in a closed area and in close contact, have rarely been performed; myocarditis combined with DIC may lead to the formation of a thrombus in the heart, resulting in thromboembolism and multiorgan failure; sepsis may occur due to infection with the novel coronavirus; diagnostic imaging of microthrombosis caused by diseases such as sepsis is difficult; diagnosis is difficult because the initial circulatory abnormalities are of microvascular; tests and examinations of the blood coagulation system including D-dimer, echocardiography, and vascular ultrasound are considered effective for patients with novel coronavirus pneumonia; once diagnosis of DIC can be made, dramatic improvement in symptoms can be expected with anticoagulation treatment; and prevention of thrombosis can be a basic strategy of treatment for novel coronavirus pneumonia.

The article "Many severe COVID-19 patients are inferred to be suffering from sepsis" (Japan Medical Journal website: https://www.jmedj.co.jp/journal/paper/detail.php?id=14563) points out that many of the severe cases and deaths due to the novel coronavirus infection (COVID-19) have sepsis. The present aspect example provides a non-invasive method or technique in order to provide information on sepsis.

The Japanese Ministry of Health, Labour and Welfare in its "Manual for serious side effects by disease: Disseminated Intravascular Coagulation (systemic hypercoagulopathy, consumption coagulopathy)" June 2007, points out that sepsis disrupts the balance between blood coagulation and thrombolysis, resulting in a condition with a poor prognosis referred to as DIC, in which blood clots form throughout the body and microvascular bleeding occurs. The present aspect example provides a non-invasive method or technique in order to provide information on DIC, blood coagulation, thrombolysis, thrombus, bleeding, and so forth.

The article "COVID-19 and Coagulopathy: Frequently Asked Questions" (AMERICAN SOCIETY OF HEMATOLOGY website: https://www.hematology.org/covid-19/covid-19-and-coagulopathy) makes the following observations with respect to patients with novel coronavirus infection (COVID-19): when DIC occurs in these patients, there is a possibility of thrombus formation in various microvessels, mainly in the lungs: the correlation between blood test values representing sthenia of blood coagulation and aggravation of COVID-19 strongly supports this possibility; thrombus formation in blood vessels is also thought to be a cause of frequent occurrence of not only lung but also heart and kidney disorders; and there are cases of vascular inflammation symptoms similar to Kawasaki disease as a skin symptom. The present aspect example provides a non-invasive method or technique in order to provide information on thrombi, blood coagulation, vascular inflammation, and so forth.

The publication "Guideline for clinical practice of novel coronavirus disease 2020 19-COVID 2nd edition" (Japanese Ministry of Health, Labour and Welfare website: https://www.mhlw.go.jp/content/000631552.pdf) lists the following as useful and possible markers of aggravation of novel coronavirus infection (COVID-19): D-dimer, CRP (C-reactive protein), LDH (serum lactate dehydrogenase), ferritin, lymphocytes, and creatinine. In particular, the guideline points out a correlation between blood test values representing sthenia of blood coagulation and aggravation of COVID-19. In addition to these, some literature states the usefulness of cardiac muscle topolonin (Tn), IL-1β, IL-6, IL-8, TNFa, IFNa, and so forth. The present aspect example provides a non-invasive method or technique in order to provide information on a change in a blood characteristic as reflected in these markers of aggravation.

The data processor 20 of the present aspect example may be designed and configured taking the background as described above into account. Some aspect examples of the data processor 20 will be described below. The data processor 20 (and the data structure 100) may also be designed and configured in similar manners in the cases where other infectious diseases are addressed.

Figure 3:
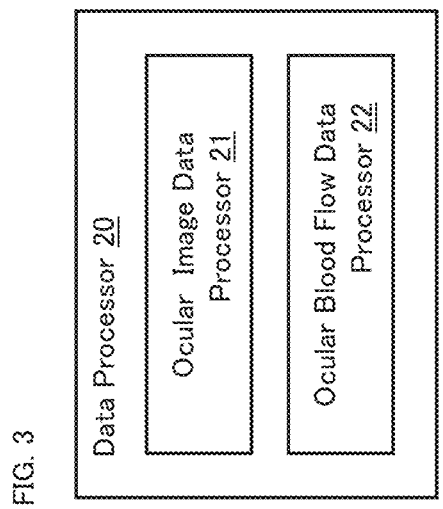
FIG. 3 is a diagram illustrating an example of a configuration of a medical system according to an aspect example.

FIG. 3 shows a configuration example of the data processor 20 of the present aspect example. The data processor 20 in the present example includes the ocular image data processor 21 and the ocular blood flow data processor 22.

The ocular image data processor 21 may include, for example, a processor configured to operate in accordance with a program created based at least on the medical knowledge as described above. In this case, the ocular image data processor 21 may generate, by using at least this processor, information on the circulatory system of the patient by processing image data acquired from the eye fundus of the patient by means of the data acquiring unit 10. This image data is referred to as ocular image data.

The ocular image data input into the processor may be, for example, optical coherence tomography image data, color fundus image data, or other types of ocular image data. The information output from the processor may include, for example, any of the following information as mentioned above: information on thrombophilia; information on a thrombus symptom; information on the state of the circulatory system accompanying an infectious disease; information representing the state related to sepsis; information representing the state related to DIC; information representing the state related to a thrombus; and information representing the state related to vascular occlusion.

The ocular image data processor 21 may include, for example, a learned model constructed by using machine learning based at least on the medical knowledge as described above. In this case, the ocular image data processor 21 may generate, by using at least this learned model, information on the circulatory system of the patient by processing image data (ocular image data) acquired from the eye fundus of the patient by means of the data acquiring unit 10.

The ocular image data input into the learned model may be, for example, optical coherence tomography image data, color fundus image data, or other types of ocular image data. The information output from the learned model may include, for example, any of the following information as mentioned above: information on thrombophilia; information on a thrombus symptom; information on the state of the circulatory system accompanying an infectious disease; information representing the state related to sepsis; information representing the state related to DIC; information representing the state related to a thrombus; and information representing the state related to vascular occlusion.

Figure 4:
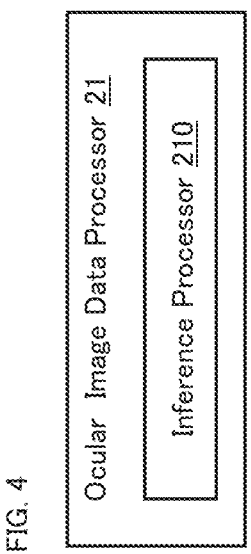
FIG. 4 is a diagram illustrating an example of a configuration of a medical system according to an aspect example.

An example of the ocular image data processor 21 configured using machine learning is shown in FIG. 4. The ocular image data processor 21 of the present example includes the inference processor 210. The inference processor 210 is configured to execute inference processing that derives information on the circulatory system of the patient from ocular image data acquired by means of the data acquiring unit 10, by using a learned model constructed by machine learning using training data that includes clinical data such as ocular image data and diagnostic result data.

The ocular image data included in the training data is, for example, image data acquired using the same type of optical modality as the optical modality of the data acquiring unit 10; however, the ocular image data included in the training data may be acquired using a modality of another type. Examples of this another modality include an optical modality different from the optical modality of the data acquiring unit 10, an ultrasonic modality, an electrical modality, a magnetic modality, an electromagnetic modality, and so forth. The diagnostic result data included in the training data may be, for example, data obtained by a doctor or another inference model (learned model) based on related ocular image data.

By conducting machine learning (supervised learning) based on such training data, a learned model (inference model) can be created. This learned model is configured to receive an input of ocular image data acquired by the data acquiring unit 10 and to output inferred diagnostic data on a circulatory system. The training data used for machine learning may include data generated by a computer on the basis of clinical data. The machine learning of some examples may include transfer learning.

The inference processor 210 includes the learned model obtained in this way, and is configured to input ocular image data acquired by the use of the data acquiring unit 10 into the learned model, and to send resulting inferred diagnostic data output from the learned model to the output unit 30.

Machine learning algorithms that can be used for some aspect examples are not limited to supervised learning, and may be any types of algorithms such as unsupervised learning, semi-supervised learning, reinforcement learning, transduction, and multi-task learning. A combination of any two or more algorithms may also be employed.

Methods and techniques of the machine learning that can be used for some aspect examples may be freely selected, and may be any methods and techniques such as neural network, support vector machine, decision tree learning, association rule learning, genetic programming, clustering, Bayesian network, feature learning, representation learning, and extreme learning machine. A combination of any two or more methods and techniques may also be employed.

Figure 5:
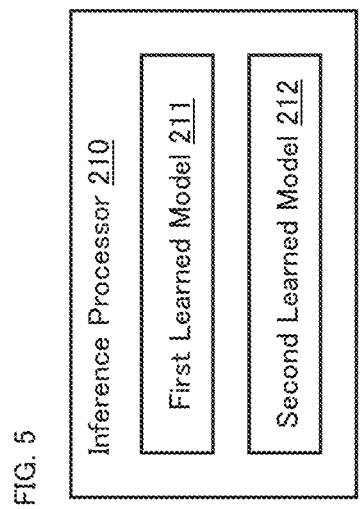
FIG. 5 is a diagram illustrating an example of a configuration of a medical system according to an aspect example.

An example of the configuration of the inference processor 210 is shown in FIG. 5. The inference processor 210 of the present example includes the first learned model 211 and the second learned model 212. Note that the inference processor 210 of some aspect examples may include only one of the first learned model 211 and the second learned model 212.

The first learned model 211 is constructed by machine learning using training data that includes ocular image data and diagnostic result data. For example, the first learned model 211 includes a convolutional neural network (CNN). The convolutional neural network includes, for example, an input layer, a convolutional layer, a pooling layer, a fully connected layer, and an output layer. Ocular image data is input into the input layer, and the convolutional layer applies filtering (convolution) to the ocular image data input, thereby creating a feature map. The pooling layer executes data compression while retaining the features obtained by the convolutional layer, and the fully connected layer extracts characteristic findings (feature findings, property findings) from all the data obtained by the pooling layer and then makes a determination (judgment). The output layer outputs the data obtained by the fully connected layer. By inputting ocular image data acquired by the data acquiring unit 10 into the first learned model 211, information on a circulatory system with a predetermined feature taken into account is generated.

Examples of the feature considered by the first learned model 211 may include a feature related to a state of depiction, a feature related to a depicted object, and so forth. Examples of the feature related to the state of depiction include color tone, brightness, and other features. Examples of the feature related to the depicted object include a 3' feature related to a fundus blood vessel, a feature related to an optic nerve head, a feature related to a macula, and features related to other sites.

In the present aspect example, a feature related to a fundus blood vessel is considered, in particular, in order to generate information on a circulatory system. The feature related to a fundus blood vessel may, for example, include any one or more of a distribution, thickness (blood vessel diameter), tortuosity (features on blood vessel running), bleeding (hemorrhage), and other blood vessel features. In some examples, features such as rupture (break) of a retinal microvessel, hemorrhage, or a running abnormality may be detected from ocular image data of a patient with sepsis or DIC.

As one aspect example, a description will be given of an example in which image data representing the morphology (structure) of an eye fundus, such as optical coherence tomography angiography image data, is acquired. In this case, the first learned model 211 includes, for example, a convolutional neural network constructed by machine learning using training data that includes optical coherence tomography angiography image data and diagnostic result data. Note that the training data may include any kinds of image data such as fluorescent contrast fundus image data. The convolutional neural network of the present aspect example includes, for example, an input layer, a convolutional layer, a pooling layer, a fully connected layer, and an output layer. Optical coherence tomography angiography image data is input into the input layer, and the convolutional layer applies filtering (convolution) to this optical coherence tomography angiography image data, thereby creating a feature map with regard to a vascular structure. The pooling layer executes data compression while retaining the features of the vascular structure obtained by the convolutional layer, and the fully connected layer extracts characteristic findings (feature findings, property findings) of the vascular structure from all the data obtained by the pooling layer and then makes a determination (judgment). The output layer outputs the data obtained by the fully connected layer. By inputting optical coherence tomography angiography image data acquired by the data acquiring unit 10 into the first learned model 211, information regarding the circulatory system with the vascular structure of the eye fundus taken into account is generated.

As another aspect example, a description will be given of an example in which color fundus image data is acquired. In this case, the first learned model 211 includes, for example, a convolutional neural network constructed by machine learning using training data that includes color fundus image data and diagnostic result data. The convolutional neural network of the present aspect example includes, for example, an input layer, a convolutional layer, a pooling layer, a fully connected layer, and an output layer. Color fundus image data is input into the input layer, and the convolutional layer creates a feature map with regard to color information (e.g., R value, G value, B value) by applying filtering (convolution) to the color fundus image data input. The pooling layer executes data compression while retaining the features of the color information obtained by the convolutional layer, and the fully connected layer extracts characteristic findings (feature findings, property findings) of the color information from all the data obtained in the pooling layer and then makes a determination (judgment). The output layer outputs the data obtained by the fully connected layer. By inputting color fundus image data acquired by the data acquiring unit 10 into the first learned model 211, information regarding the circulatory system with the color tone of the eye fundus taken into account is generated.

The second learned model 212 is constructed by machine learning using training data that includes diagnostic result data and data generated by processing ocular image data acquired from eye fundi using a predetermined modality.

In the case where the data generated by processing the ocular image data is image data, the second learned model 212 includes, for example, a convolutional neural network. The convolutional neural network includes, for example, an input layer, a convolutional layer, a pooling layer, a fully connected layer, and an output layer. Image data generated by processing ocular image data is input into the input layer, and the convolutional layer applies filtering (convolution) to the input image data, thereby creating a feature map. The pooling layer executes data compression while retaining the features obtained by the convolutional layer, and the fully connected layer extracts characteristic findings (feature findings, property findings) from all the data obtained by the pooling layer and then makes a determination (judgment). The output layer outputs the data obtained by the fully connected layer. By inputting data generated by processing ocular image data acquired by the data acquiring unit 10 into the second learned model 212, information regarding the circulatory system with a predetermined feature taken into account is generated. The features considered by the second learned model 212 may be the same as or different from features considered by the first learned model 211.

Data input into the second learned model 212 is not limited to image data. For example, data input into the second learned model 212 may be numerical data, distribution data, time series data, or other kinds of data. In the case where data of a form other than image data is input into the second learned model 212, the second learned model 212 is constructed based on the form (type, kind) of data to be input, the features to be considered, and other matters and items. For example, in the case of processing time series data such as waveform data or follow-up data, the second learned model 212 may include a recurrent neural network (RNN).

In the case where data input into the inference processor 210 is moving image (video) data, a learned model used for processing the moving image data may have, for example, a structure obtained by combining a convolutional neural network and a recurrent neural network.

The ocular blood flow data processor 22 may include, for example, a processor configured to operate in accordance with a program created based at least on the medical knowledge as described above. In this case, the ocular blood flow data processor 22 may generate, by using at least this processor, information on the circulatory system of the patient by processing data (ocular blood flow data) acquired from the eye fundus of the patient by the use of the data acquiring unit 10.

The ocular blood flow data input into the processor may be, for example, data obtained by the use of the optical coherence tomography blood flow measurement. Data obtained by the optical coherence tomography blood flow measurement may include any one or more of the following kinds of data, for example: image data of a waveform representing a time series change in blood flow dynamics (e.g., blood flow velocity, blood flow rate, etc.); image data of a map representing a spatial distribution of blood flow dynamics; image data representing both a spatial distribution of and a time series change in blood flow dynamics; a series of sets (a series of pairs) of numerical values and times (time points) representing a time series change in blood flow dynamics; a series of sets (a series of pairs) of numerical values and coordinates representing a spatial distribution of blood flow dynamics: a series of sets (a series of triplets) of numerical values, coordinates, and times (time points) representing both a spatial distribution and a time series change in blood flow dynamics, and data of other forms. The information output from the processor may include, for example, any one or more of the following kinds of information as mentioned above: information on thrombophilia; information on a thrombus symptom; information on the state of the circulatory system accompanying an infectious disease; information representing the state related to sepsis; information representing the state related to DIC; information representing the state related to a thrombus; and information representing the state related to vascular occlusion.

The ocular blood flow data processor 22 may include, for example, a learned model constructed by machine learning based at least on the medical knowledge as described above. In this case, the ocular blood flow data processor 22 may generate, by using at least this learned model, information on the circulatory system of the patient by processing data (ocular blood flow data) acquired from the eye fundus of the patient by the use of the data acquiring unit 10.

The ocular blood flow data input into the learned model may be, for example, data obtained by the use of the optical coherence tomography blood flow measurement, as in the case of the processor described above. The information output from the learned model may also be, for example, the same or similar type of information as or to that in the case of the processor described above.

Figure 6:
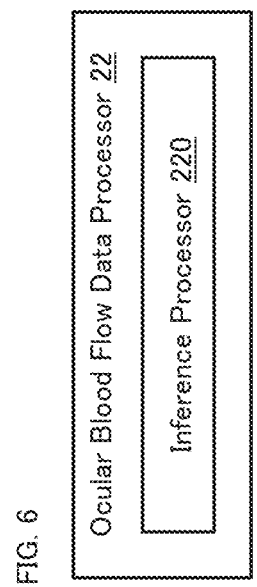
FIG. 6 is a diagram illustrating an example of a configuration of a medical system according to an aspect example.

FIG. 6 shows an example of the ocular blood flow data processor 22 configured using machine learning. The ocular blood flow data processor 22 of the present example includes the inference processor 220. The inference processor 220 is configured to execute inference processing that derives information on the circulatory system of the patient from ocular blood flow data acquired by the data acquiring unit 10. This inference processing is executed by the use of a learned model that has been constructed by machine learning using training data. This training data includes clinical data such as ocular blood flow data and diagnostic result data.

The ocular blood flow data included in the training data is, for example, data acquired using the same type of optical modality as the optical modality of the data acquiring unit 10; however, the ocular blood flow data included in the training data may be acquired using a modality of another type. Examples of this another modality include an optical modality different from the optical modality of the data acquiring unit 10, an ultrasonic modality, an electrical modality, a magnetic modality, an electromagnetic modality, and so forth. The diagnostic result data included in the training data may be, for example, data obtained by a doctor or another inference model (learned model) based on related ocular blood flow data.

By conducting machine learning (supervised learning) based on such training data, a learned model (inference model) may be created which is configured to receive an input of ocular blood flow data acquired by the data acquiring unit 10 and to output inferred diagnostic data on the circulatory system. The training data used for machine learning may include data generated using a computer on the basis of clinical data. The machine learning of some examples may include transfer learning. Machine learning algorithms and methods and techniques of the machine learning may be the same as or similar to those of the ocular image data processor 21.

The inference processor 220 includes the learned model obtained in this way, and is configured to input ocular blood flow data acquired by the use of the data acquiring unit 10 into the learned model, and to send resulting inferred diagnostic data output from the learned model to the output unit 30.

Figure 7:
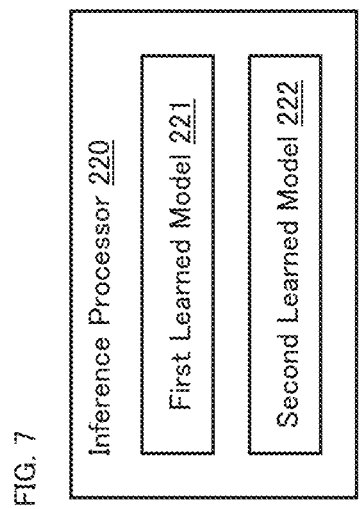
FIG. 7 is a diagram illustrating an example of a configuration of a medical system according to an aspect example.

An example of the configuration of the inference processor 220 is shown in FIG. 7. The inference processor 220 of the present example includes the first learned model 221 and the second learned model 222. In some aspect examples, the inference processor 220 may include only one of the first learned model 221 and the second learned model 222. Various kinds of matters and items regarding the learning model provided in the inference processor 220 may be the same as or similar to the corresponding matters and items in the learning model provided in the inference processor 210 unless otherwise mentioned.

The first learned model 221 is constructed by performing machine learning using training data that includes ocular blood flow data and diagnostic result data. The first learned model 221 includes, for example, a model corresponding to the type (kind, form, mode) of input data and the type (kind, form, mode) of output data. For example, the first learned model 221 may include a convolutional neural network the same or similar to the convolutional neural network of the first learned model 211 of the ocular image data processor 21. By inputting the ocular blood flow data acquired by the data acquiring unit 10 into the first learned model 221, information on the circulatory system is generated. The features to be considered by the first learned model 221 may be the same as or different from the features considered by the first learned model 211 of the ocular image data processor 21.

The second learned model 222 is constructed by performing machine learning using training data that includes diagnostic result data and data generated by processing data acquired from eye fundi using a predetermined modality. The data generated by processing the data obtained from the eye fundi may be of any type, such as image data, numerical data, distribution data, time series data, or data of other types. The second learned model 222 includes, for example, a model corresponding to the type (kind, form, mode) of input data and the type (kind, form, mode) of output data, By inputting the data obtained by processing the data acquired by the data acquiring unit 10 into the second learned model 222, information on the circulatory system is generated. The features to be considered by the second learned model 222 may be the same as or different from the features considered by the second learned model 212 of the ocular image data processor 21. Further, the data to be input into the second learned model 222 may include, for example, any one or more of the following types of data: ocular blood flow data generated by processing ocular blood flow data obtained from the eye fundus using a predetermined modality; data of a type other than ocular blood flow data generated by processing ocular blood flow data obtained from the eye fundus using a predetermined modality; ocular blood flow data generated by processing data of a type other than ocular blood flow data obtained from the eye fundus using a predetermined modality.

The output unit 30 is configured to output a result of processing performed by the data processor 20. The mode or aspect of output processing may be freely selected, and may be any of transmission, display, recording, and printing. Information output by the output unit 30 may be the result of the processing executed by the data processor 20 (e.g., the information on the circulatory system of the patient), may be information including the result of the processing, or may be information generated by applying further processing to the result of the processing. For example, the medical system 1 may further include a report generating processor (not shown in the drawings) that is configured to generate a report based on the information on the circulatory system obtained by the data processor 20. If this is the case, the output unit 30 may be capable of outputting the report generated in this way.

The output unit 30 shown in FIG. 1 includes the transmitter 31. The transmitter 31 is configured to transmit a result of processing performed by the data processor 20 to the doctor's computer terminal 3. The doctor's computer terminal 3 is located in a remote place from the data acquiring unit 10.

The transmission of data from the output unit 30 to the doctor's computer terminal 3 may be direct transmission or indirect transmission. The direct transmission is a mode or aspect of transmitting a result of the processing (e.g., information on a circulatory system, a report, etc.) from the output unit 30 to the doctor's computer terminal 3. On the other hand, the indirect transmission is a mode or aspect of transmitting a result of the processing to an apparatus or device (e.g., a server, a database, etc.) other than the doctor's computer terminal 3 and then providing the result of the processing to the doctor's computer terminal 3 from this apparatus or device.

By employing the configuration, as in the present example, in which the doctor's computer terminal 3 is placed at a remote location from the data acquiring unit 10 and in which information (or information generated from this information) generated by the data processor 20 based on data acquired from the eye fundus of the patient by the use of the data acquiring unit 10 is provided to the doctors computer terminal 3, social distance between the doctor (healthcare worker) and the patient can be maintained, and therefore the risk of infection to the doctor (healthcare worker) can be reduced.

<Usage Mode of Medical System>

Figure 8:
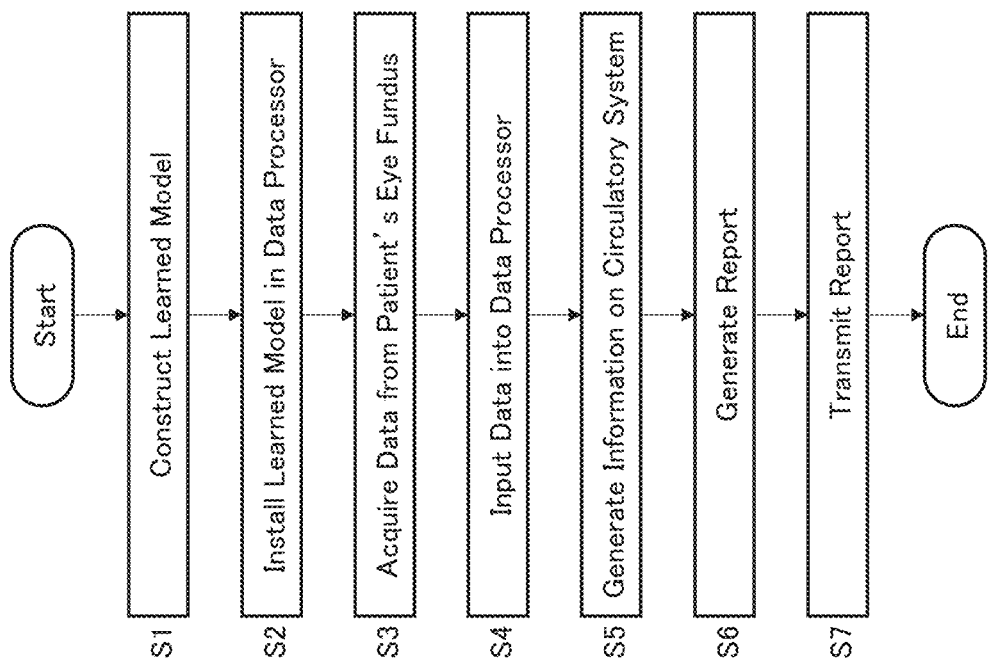
FIG. 8 is a flowchart illustrating an example of an operation of a medical system according to an aspect example.

A usage mode of the medical system 1 according to the present aspect example will be described. The flowchart of FIG. 8 shows an example of a usage mode of the medical system 1. While the present example employs a learned model, an example without the use of a learned model does not require construction and installation of a learned model (the steps S1 and S2 of the flowchart). In such an example, a processing program is created and installed in place of construction and installation of a learned model.

(S1: Construct Learned Model)

In preparation for putting the medical system 1 into implementation, a learned model to be used by the data processor 20 is constructed. Note that processing performed at this stage may be updating of a learned model that is already being in use, that is, adjustment or updating of parameters in a learned model that is already being in use.

(S2: Install Learned Model in Data Processor)

In further preparation for putting the medical system 1 into implementation, the learned model constructed in the step S1 is installed in the data processor 20. In this process, for example, the learned model constructed in the step S1 is transmitted to the medical system 1 through a communication line.

(S3: Acquire Data from Patient's Eye Fundus)

A subject may be, for example, a patient with a confirmed diagnosis (definitive diagnosis) of novel coronavirus infection (COVID-19) or a patient with suspected novel coronavirus infection (COVID-19). The data acquiring unit 10 of the medical system 1 acquires data from the eye fundus of the patient using at least one optical modality.

The data acquiring unit 10 may apply, for example, optical coherence tomography and/or color fundus photography to the eye fundus. Data acquired by optical coherence tomography may be any of the following data, for example: three dimensional image data; projection image data; optical coherence tomography angiography image data; and optical coherence tomography blood flow data. Data acquired by color fundus photography may be, for example, color front image data that represents the morphology of the eye fundus.

One or more of the examinations carried out in the present process may be a remote examination(s) using the operation device 2.

(S4: Input Data into Data Processor)

The data acquired in the step S3 is sent to the data processor 20. In the present example, at least part of the data that has been input into the data processor 20 is input into the learned model constructed in the step S1.

(S5: Generate Information on Circulatory System)

The data processor 20 executes processing of the data input in the step S4 to generate information on the circulatory system of the patient. As a result of this processing, for example, at least one of the following kinds of information can be obtained: information on thrombophilia (information on blood characteristic, and/or information representing a change in a blood characteristic caused by sthenia of a blood coagulation and fibrinolytic system); information on a thrombus symptom (information representing a distribution of blood flow velocity in a blood vessel, and/or information on an object formed in a blood vessel (an intravascular formation)); information on the state (and/or a change in the state) of the circulatory system accompanying an infectious disease; information representing the state related to sepsis; information representing the state related to DIC information representing the state related to a thrombus; and information representing the state related to vascular occlusion.

The information generated by the data processor 20 is recorded, for example, in accordance with the data structure 100 of FIG. 2. This provides a data package for the circulatory system of the patient.

(S6: Generate Report)

The medical system 1 (the report generating processor mentioned above, which is not shown in the drawings) generates a report based on the information regarding the circulatory system of the patient generated in the step S5.

(S7: Transmit Report)

The transmitter 31 of the output unit 30 transmits the report generated in the step S6 to the doctor's computer terminal 3 that is located remotely from the data acquiring unit 10. Alternatively, the transmitter 31 of the output unit 30 transmits the report to a computer that is capable of providing information to the doctor's computer terminal 3. The doctor's computer terminal 3 is not limited to a computer used by a doctor, and may be a computer used by a healthcare worker other than a doctor (healthcare worker's computer terminal).

According to the medical system 1 of the present aspect example, it becomes possible to keep social distances between healthcare workers and patients, and the risks of healthcare workers getting infected from patients can be reduced. Furthermore, since the medical system 1 is configured to acquire data from the eye fundus of the patient using a non-invasive optical modality such as optical coherence tomography or color fundus photography, and to generate information on the circulatory system of the patient from the data acquired, a technique and technology for a non-invasive detection of the state of the circulatory system of the patient can be provided. The state of the circulatory system detected by the medical system 1 is, for example, information on the basis of the medical knowledge described above and/or other medical knowledge. Examples of such information include a symptom, a sign of aggravation, and a risk of aggravation.

First Embodiment of Medical System

A description will be given of an embodiment example of the medical system 1 described above. In the present embodiment example, a case in which the data acquiring unit 10 performs optical coherence tomography will be described. In particular, a description will be given of a case in which the data acquiring unit 10 performs optical coherence tomography blood flow measurement. Based on the aforementioned medical knowledge, the present embodiment example is configured to generate information on a blood coagulation and fibrinolytic system from ocular blood flow data acquired by the use of the optical coherence tomography blood flow measurement. The medical system of the present embodiment example may have the same or similar configuration as or to the medical system 1 described above, unless otherwise mentioned.

Figure 9:
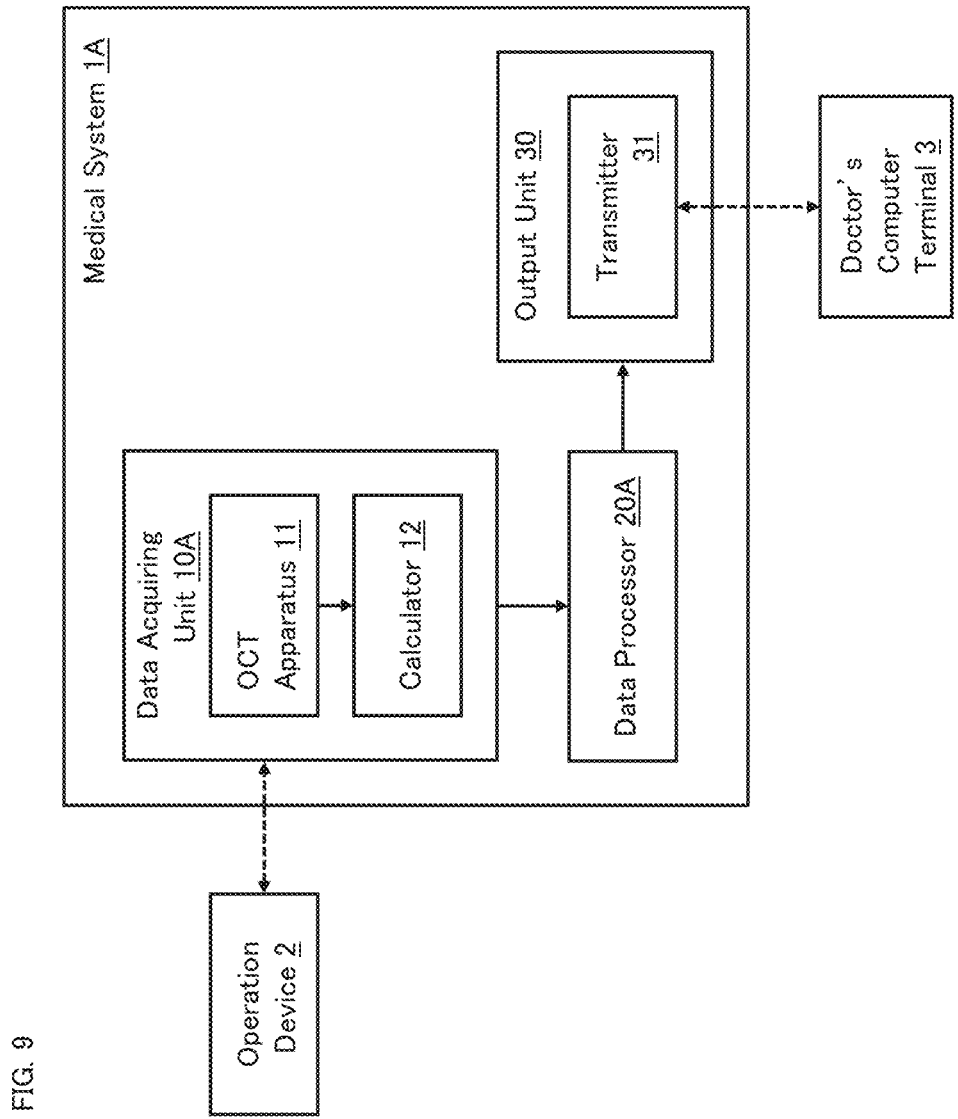
FIG. 9 is a diagram illustrating an example of a configuration of a medical system according to an aspect example.

FIG. 9 shows a configuration example of the medical system according to the present embodiment example. The medical system 1A of the present example includes the data acquiring unit 10A, the data processor 20A, and the output unit 30. The output unit 30 and the transmitter 31 are the same as or similar to the output unit 30 and the transmitter 31 in the medical system 1, respectively. The same is true for the operation device 2 and the doctor's computer terminal 3.

The data acquiring unit 10A is an example of the data acquiring unit 10 of the medical system 1 described above.

The data acquiring unit 10A includes the optical coherence tomography (OCT) apparatus 11 and the calculator 12.

The optical coherence tomography apparatus 11 applies scanning for optical coherence tomography blood flow measurement to the eye fundus of the patient. The calculator 12 is configured to generate ocular blood flow data based on the data collected by the scanning carried out by the optical coherence tomography apparatus 11. The ocular blood flow data includes blood flow velocity and blood vessel diameter at the location to which the scanning is applied. The method or technique of the scanning performed by the optical coherence tomography apparatus 11 and the method or technique of the calculation executed by the calculator 12 may be any known method or technique. For example, the method or technique described in Japanese Unexamined Patent Application Publication No. 2020-48730 may be employed.

Figure 10:
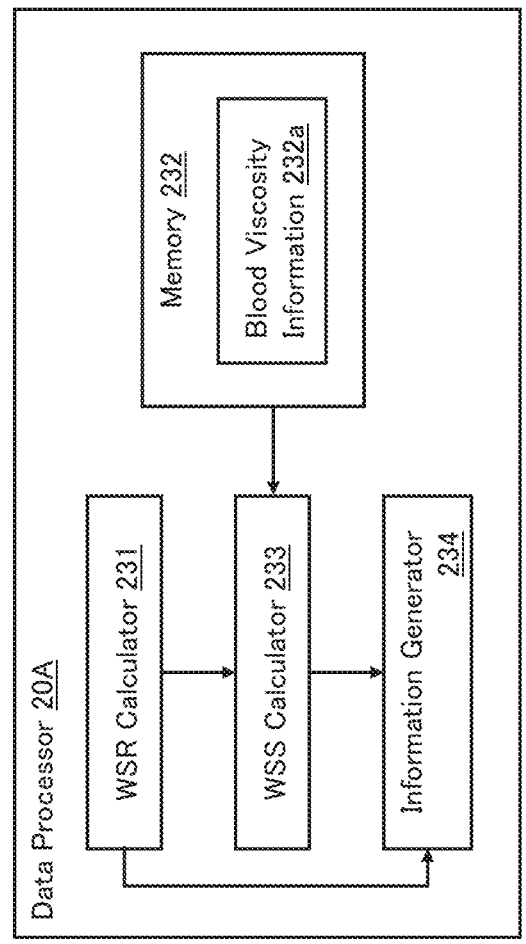
FIG. 10 is a diagram illustrating an example of a configuration of a medical system according to an aspect example.

The data processor 20A is configured to process the ocular blood flow data acquired by the data acquiring unit 10A in order to generate information on the blood coagulation and fibrinolytic system. FIG. 10 shows a configuration example of the data processor 20A. The data processor 20A of the present example includes the wall shear rate (WSR) calculator 231, the memory 232, the wall shear stress (WSS) calculator 233, and the information generator 234.

The WSR calculator 231 is configured to calculate a wall shear rate (WSR) based on the blood flow velocity and the blood vessel diameter calculated by the calculator 12 of the data acquiring unit 10A. The method or technique for calculating wall shear rate from blood flow velocity and blood vessel diameter may be freely selected or determined.

For example, the method or technique as described in the following paper may be employed: Taiji Nagaoka and Akitoshi Yoshida "Noninvasive Evaluation of Wall Shear Stress on Retinal Microcirculation in Humans", IOVS. 2006, Vol. 47, 1113-1119. Although blood flow velocity and blood vessel diameter are measured using laser Doppler velocimetry (LDV) in the method according to this paper, it is clear to a person having ordinary skill in the art that the same wall shear rate calculation method can be applied to blood flow velocity and blood vessel diameter obtained using optical coherence tomography as in the present embodiment example.

As in the method of this paper, the optical coherence tomography apparatus 11 of the data acquiring unit 10A collects data by applying scanning during a period equal to or longer than one cardiac cycle. The calculator 12 calculates the time average ($V_{mean}$) of the (central line) blood flow velocity in one cardiac cycle as the blood flow velocity. The calculator 12 also calculates the blood vessel diameter (D) from the cross sectional image data constructed from the data collected by the scanning over one cardiac cycle mentioned above. The WSR calculator 231 calculates the wall shear rate (WSR) according to the following formula: $WSR = 8 \times V_{mean}/D$.

The calculator 12 can calculate the blood vessel cross sectional area (Area) from the cross sectional image data constructed from the data collected by the aforementioned scanning over one cardiac cycle. Furthermore, the calculator 12 can calculate the blood flow rate (BF) by multiplying the time average ($V_{mean}$) of the blood flow velocity by the blood vessel cross sectional area (Area) as in the following formula: $BF = V_{mean} \times Area$.

The memory 232 stores the blood viscosity information 232a. The blood viscosity information 232a includes the blood viscosity value η. The blood viscosity value q may be an actual measurement value or a standard value. Measurement of blood viscosity is performed using, for example, a cone and plate viscometer. In some alternative aspect examples, blood viscosity may be estimated from data obtained from a blood test such as hematocrit (Ht), red blood cell count (erythrocyte count), corpuscular constants (erythrocyte indices) (e.g., mean corpuscular volume or mean cell volume (MCV), mean corpuscular hemoglobin or mean cell hemoglobin (MCH), etc.), In some further alternative aspect examples, blood viscosity may be estimated by substituting a predetermined value for a blood parameter such as blood plasma viscosity. A normal value, a diseased value, or the like value may be used as a standard value. Here, the normal value and the diseased value can be determined based on a range of blood viscosity values derived from data such as clinical data or experimental data.

The WSS calculator 233 is configured to calculate wall shear stress (WSS) based at least on the wall shear rate calculated by the WSR calculator 231 and the blood viscosity value included in the blood viscosity information 232a. The method or technique for calculating wall shear stress from wall shear rate and blood viscosity value may be freely selected or determined. For example, using the method or technique as described in the aforementioned paper (Nagaoka and Yoshida), the WSS calculator 233 executes calculation of wall shear stress (WSS) according to the following formula: $WSS = \eta \times WSR$.

The information generator 234 is configured to generate information on the circulatory system of the patient based at least on the wall shear stress calculated by the WSS calculator 233. In the present embodiment example, the information generator 234 can generate information on the blood coagulation and fibrinolytic system as the information on the circulatory system of the patient.

The following paper shows that erythrocyte deformability is impaired and wall shear stress is increased in the blood of animal models of sepsis: Michael R. Condon et al. "Appearance of an erythrocyte population with decreased deformability and hemoglobin content following sepsis", Am J Physiol Heart Circ Physiol 284: H2177-2184, 2003. Increased wall shear stress promotes vascular endothelial dysfunction and is therefore thought to be associated with thrombophilia. On the basis of background such as this, the information generator 234 may be configured to execute assessment of a wall shear stress value calculated by the WSS calculator 233 and then generate information including a result of the assessment.

Note that in the case where a standard value (predetermined value, default value) is adopted as the blood viscosity, that is, in the case where the parameter r is assumed to be a constant value in the above equation "$WSS = \eta \times WSR$", values of WSR and values of WSS are in one-to-one correspondence. Therefore, if this is the case, there is no need to provide the memory 232 and the WSS calculator 233, and further, the information generator 234 may be configured to generate information on the circulatory system of the patient (information on the blood coagulation and fibrinolytic system) based on the value of the wall shear rate calculated by the WSR calculator 231.

Second Embodiment of Medical System

A description will be given of another embodiment example of the medical system 1. In the present embodiment example, as in the first embodiment example, the data acquiring unit 10 performs optical coherence tomography blood flow measurement. From ocular blood flow data acquired by the optical coherence tomography blood flow measurement, the present embodiment example generates information on a blood coagulation and fibrinolytic system, and also generates information on an object formed in a blood vessel (information on an intravascular formation). The medical system of the present embodiment example may have the same or similar configuration as or to the medical system(s) 1 and/or 1A described above, unless otherwise mentioned.

Figure 11:
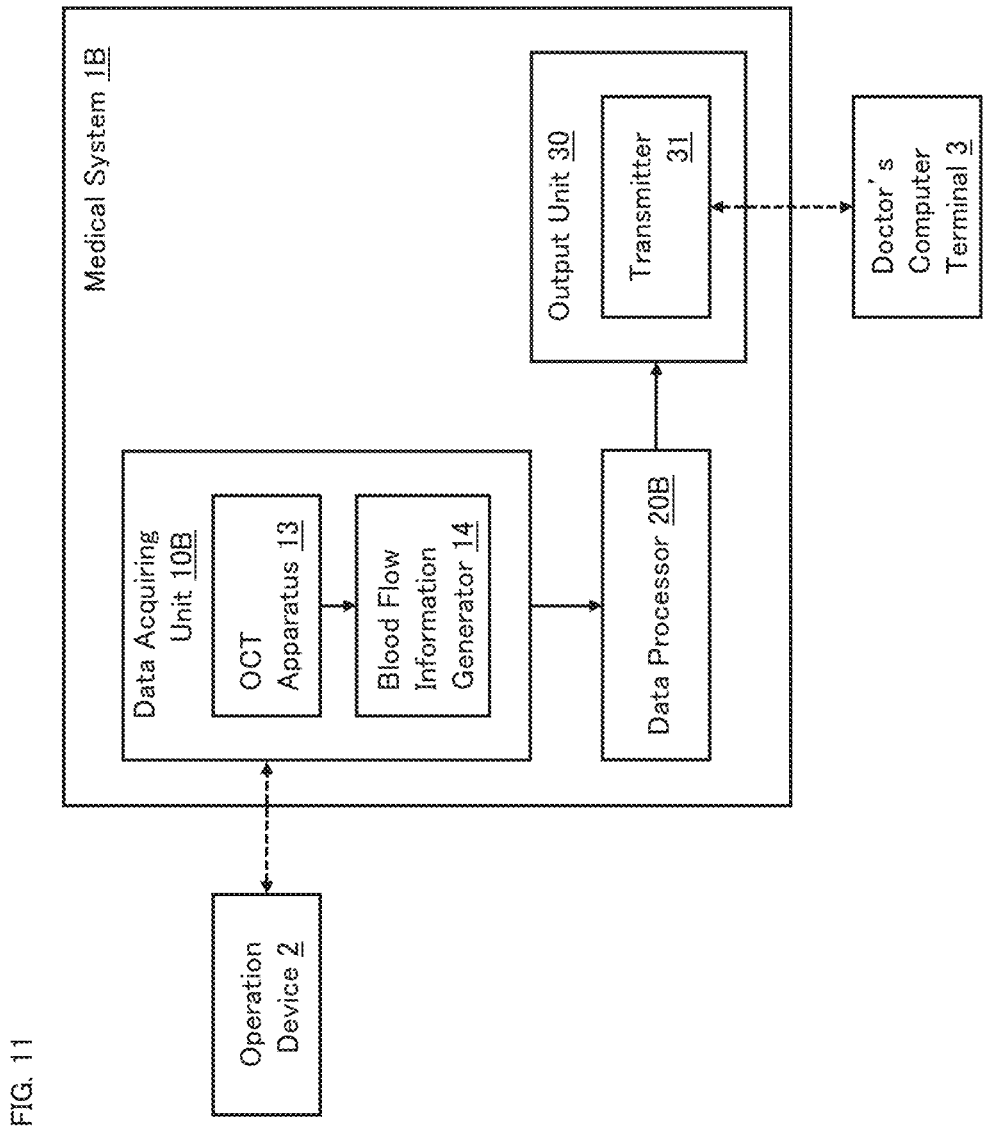
FIG. 11 is a diagram illustrating an example of a configuration of a medical system according to an aspect example.

FIG. 11 shows a configuration example of the medical system according to the present embodiment example. The medical system 1B of the present example includes the data acquiring unit 10B, the data processor 20B, and the output unit 30. The output unit 30 and the transmitter 31 are the same as or similar to the output unit 30 and the transmitter 31 in the medical system 1, respectively. The same is true for the operation device 2 and the doctor's computer terminal 3.

The data acquiring unit 10B is an example of the data acquiring unit 10 of the medical system 1 described above. The data acquiring unit 10B includes the optical coherence tomography (OCT) apparatus 13 and the blood flow information generator 14.

The optical coherence tomography apparatus 13 applies scanning for optical coherence tomography blood flow measurement to the eye fundus of the patient. The optical coherence tomography apparatus 13 is configured to collect time series data by repetitively applying OCT scanning to a predetermined region of the eye fundus of the patient. This optical coherence tomography scanning includes A-scans applied to at least one position (at least one A-line). For example, this optical coherence tomography scanning may be A-scans, B-scans, or circle scans applied to a plurality of positions. As a result of such optical coherence tomography scanning, time series data corresponding to each scan application position is obtained.

The blood flow information generator 14 is configured to generate ocular blood flow data based on the time series data collected by the optical coherence tomography apparatus 13. The ocular blood flow data includes blood flow information that represents a spatial distribution of blood flow velocity and a temporal change in blood flow velocity. The space in which the distribution of blood flow velocity is defined may be any of one dimensional space, two dimensional space, and three dimensional space. The temporal change in blood flow velocity is defined for each point (position) of the space. In this way, the blood flow information obtained by the blood flow information generator 14 represents a temporal change in the blood flow velocity at each point in the one dimensional space, two dimensional space, or three dimensional space inside the blood vessel to which the optical coherence tomography blood flow measurement has been applied. The blood flow information generated in this manner is described, for example, in the following paper: Robert S. Reneman and Arnold P. G. Hoeks, "Wall shear stress as measured in vivo: consequences for the design of the arterial system", Med Biol Eng Comput (2008) 46: 499-507.

The data processor 20B is configured to generate information on the blood coagulation and fibrinolytic system by processing the ocular blood flow data (blood flow information) acquired by the data acquiring unit 10B. In addition, the data processor 20B is configured to generate information on an object formed in a blood vessel by processing the ocular blood flow data (blood flow information) acquired by the data acquiring unit 10B.

Figure 12:
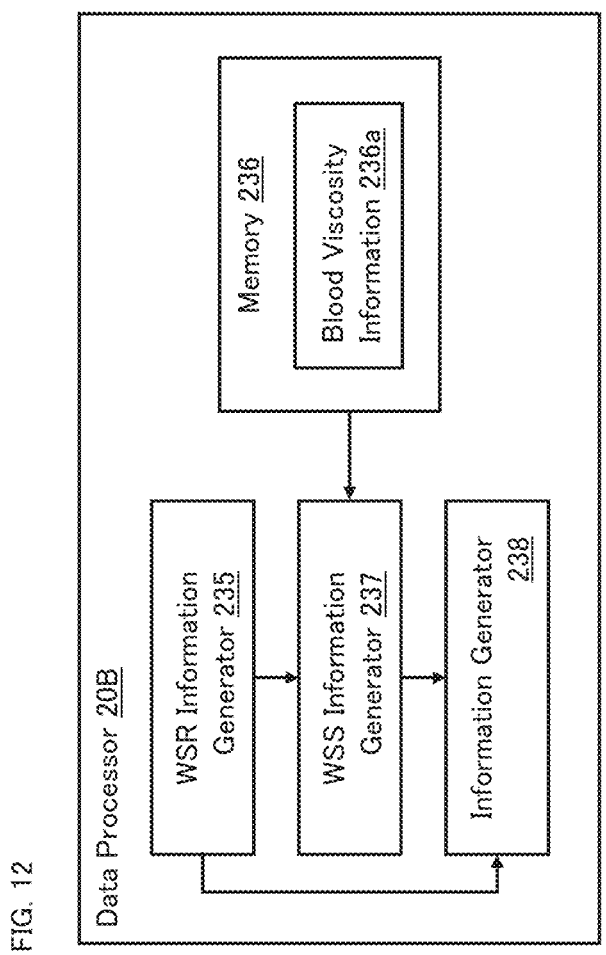
FIG. 12 is a diagram illustrating an example of a configuration of a medical system according to an aspect example.

FIG. 12 shows a configuration example of the data processor 20B. The data processor 20B of the present example includes the wall shear rate (WSR) information generator 235, the memory 236, the wall shear stress (WSS) information generator 237 and the information generator 238.

The WSR information generator 235 is configured to generate WSR information that represents a spatial distribution of wall shear rate (WSR) and a temporal change in wall shear rate (WSR) based at least on the blood flow information generated by the blood flow information generator 14 of the data acquiring unit 10B. Any method or technique may be employed for the generation of WSR information representing a spatial distribution of wall shear rate and a temporal change in wall shear rate from the blood flow information representing a spatial distribution of blood flow velocity and a temporal change in blood flow velocity. For example, the method or technique as described in the aforementioned paper (Robert S. Reneman and Arnold P. G. Hoeks) can be used.

The memory 236 stores the blood viscosity information 236a. The blood viscosity information 236a may be a single value ($\eta$) as in the blood viscosity information 232a of the first embodiment example, or it may be a distribution of blood viscosity values at least in the space of interest (the space in which a distribution of the blood flow velocity is defined). Note that the case where a single blood viscosity value ($\eta$) corresponds to the case where the blood viscosity distribution in the space of interest is Uniform (constant).

The WSS information generator 237 is configured to generate WSS information that represents a spatial distribution of wall shear stress (WSS) and a temporal change in wall shear stress (WSS) based at least on the WSR information generated by the WSR information generator 235 and the blood viscosity distribution information 236a. The method or technique for generating the WSS information may be freely selected or determined. For example, the WSS information generator 237 may be configured to generate WSS information by multiplying a wall shear rate value by a blood viscosity value for each point in the space of interest, as in the first embodiment example.

The information generator 238 may be configured to generate information on an object (e.g., thrombus) formed in a blood vessel (e.g., information on thrombophilia) based at least on the blood flow information generated by the blood flow information generator 14 of the data acquiring unit 10B and the WSS information generated by the WSS information generator 237. Furthermore, the information generator 238 may be configured to generate information on an object formed in a blood vessel based at least on the blood flow information generated by the blood flow information generator 14 of the data acquiring unit 10B and the WSR information generated by the WSR information generator 235. In addition, the information generator 238 may be configured to generate information on the blood coagulation and fibrinolytic system based on any one or more of the following information: the blood flow information generated by the blood flow information generator 14 of the data acquiring unit 10B; the WSR information generated by the WSR information generator 235; and the WSS information generated by the WSS information generator 237; and information of other kinds.

<Medical Information Processing Apparatus and Medical System>

A description will be given below of an example of a medical information processing apparatus according to an aspect example and a medical system including this medical information processing apparatus. The elements according to the aspect examples described below may be the same as or similar to the corresponding elements of any of the medical systems 1, 1A, and 1B described above, unless otherwise mentioned.

Figure 13:
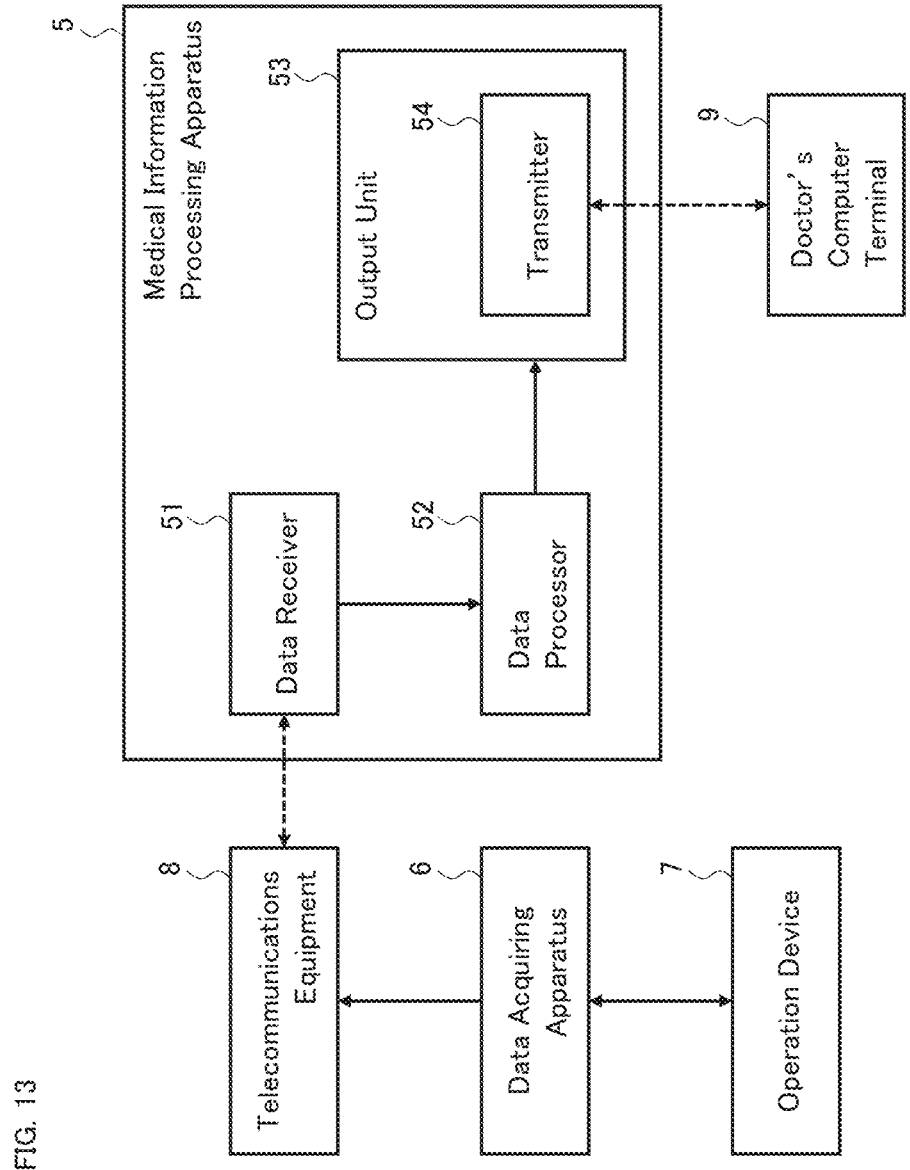
FIG. 13 is a diagram illustrating an example of a configuration of a medical information processing apparatus according to an aspect example and an example of a configuration of a medical system including the medical information processing apparatus.

The medical information processing apparatus 5 shown, as an example, in FIG. 13 includes the data receiver 51, the data processor 52, and the output unit 53. The data acquiring apparatus 6, the operation device 7, the telecommunications equipment 8, and the doctor's computer terminal 9 are provided outside the medical information processing apparatus 5 of the present aspect example.

The data acquiring apparatus 6 acquires data from the eye fundus of the patient by employing at least one optical method. The operation device 7 is used by a healthcare worker to operate the data acquiring apparatus 6 (examination apparatus). In some aspect examples, the operation device 7 is located at a remote place from the data acquiring apparatus 6 and is used to perform a remote operation of the data acquiring apparatus 6. The telecommunications equipment 8 transmits data acquired by the data acquiring apparatus 6 to the medical information processing apparatus 5. In some aspect examples, the doctor's computer terminal 9 is located at a remote place from the data acquiring apparatus 6.

The data receiver 51 of the medical information processing apparatus 5 is configured to receive data acquired from the eye fundus of the patient using at least one optical method. In the present aspect example, the data receiver 51 receives data acquired by the data acquiring apparatus 6 and transmitted by the telecommunications equipment 8, In the example shown in FIG. 13, data is sent from the data acquiring apparatus 6 to the data receiver 51 via the telecommunications equipment 8, but the manner or mode of data input into the medical information processing apparatus 5 is not limited to this. For example, data acquired by the data acquiring apparatus 6 may be stored in a database or the like, and then the data may be sent to the data receiver 51 from this database. The data receiver 51 may include, for example, a communication device (telecommunication equipment) for connecting to a communication line, a drive device that reads out data recorded on a recording medium, and so forth.

The data processor 52 is configured to process the data received by the data receiver 51 in order to generate information on the circulatory system of the patient. The output unit 53 outputs information on the circulatory system of the patient generated by the data processor 52. The output unit 53 of the present example includes the transmitter 54. The transmitter 54 can transmit information on the circulatory system of the patient generated by the data processor 52 to the doctor's computer terminal 9 which is located remotely from the data acquiring apparatus 6.

Any of the matters and items described for any of the medical systems 1, 1A and 1B described above can be combined with the medical information processing apparatus 5 or the medical system including the medical information processing apparatus 5.

According to the medical information processing apparatus 5 configured in this way and the medical system including the medical information processing apparatus 5, it becomes possible to keep social distances between healthcare workers and patients, and the risks of healthcare workers getting infected from patients can be reduced. Furthermore, the medical information processing apparatus 5 and the medical system including the medical information processing apparatus 5 are configured to acquire data from the eye fundus of the patient using a non-invasive optical modality such as optical coherence tomography or color fundus photography, and to generate information on the circulatory system of the patient from this data. This enables the medical information processing apparatus 5 and the medical system including the medical information processing apparatus 5 to provide a technique and technology for non-invasively detecting a state of the circulatory system of the patient. The state of the circulatory system detected in this way is based, for example, on the medical knowledge described above and/or other medical knowledge, and examples thereof include a symptom, a sign of aggravation, and a risk of aggravation.

<Summary>

As described thus far, the technique and technology according to the present disclosure use a non-invasive optical ophthalmic modality such as optical coherence tomography blood flow measurement, optical coherence tomography angiography, or color fundus photography to detect a state (condition) related to a circulatory system such as a tendency toward vascular inflammation, thrombophilia, a tendency toward sepsis, a tendency toward DIC, and so forth. For example, the technique and technology according to the present disclosure may be capable of detecting a change in a blood characteristic in a blood coagulation tendency that accompanies an infectious disease, based on a wall shear rate and/or a wall shear stress calculated from a blood flow velocity and/or a blood vessel diameter obtained using optical coherence tomography blood flow measurement, or based on a spatial distribution of a blood flow velocity in a cross section of a blood vessel and/or a temporal change in a blood flow velocity (temporal change in the blood flow velocity profile) in a cross section of a blood vessel. In addition, the technique and technology according to the present disclosure may be capable of inputting these kinds of data into a learned model constructed by machine learning and outputting an index or indicator related to aggravation of an infectious disease. This enables non-invasive early detection of a change in a medical condition and provision of various kinds of diagnostic support information.

For example, it is known that patients with novel coronavirus infection (COVID-19) develop thrombi in microvessels of various organs, mainly of the lungs. In addition, a correlation has been noted between various kinds of vascular test values and disease aggravation. Here, the vascular test values represent sthenia of vascular coagulation, which is one of the causes of thrombi. The progression of an increased severity of COVID-19 is considered to follow the following steps: (1) infection; (2) rapid immune response and inflammation; (3) DIC; (4) angiogenesis in multiple organs; and (5) death due to cerebral infarction, myocardial infarction, multiple organ failure, etc. There are also known cases where the steps (2) to (4) progress rapidly. In the step (2) rapid immune reaction and inflammation, various abnormalities in the coagulation system, such as decrease in platelets, increase in D-dimer, decrease in fibrinogen, and prolongation of prothrombin time (PT time), can be detected by blood tests.

The technique and technology according to the present disclosure non-invasively can detect blood flow dynamics (e.g., blood flow velocity, blood flow rate (amount, volume), shape of blood flow waveform, etc.) in a retinal blood vessel, and then carry out wall shear stress assessment, thrombi assessment (peripheral vascular occlusion assessment), or other assessments, from the detected data of the blood flow dynamics, thereby detecting the risk of aggravation of the novel coronavirus infection (COVID-19) at an early stage.

In the case where assessment is performed using a learned model constructed by machine learning, for example, a correlation between various kinds of blood test values and blood flow dynamic information (e.g., blood flow velocity, blood flow rate, blood flow waveform shape, etc.) may be employed as training data. As a result of this, a learned model can be constructed that receives an input of blood flow dynamic information and outputs blood test values. By inputting, into this learned model, ocular blood flow data (blood flow dynamic information) acquired from the eye fundus of the patient using optical coherence tomography blood flow measurement, it is possible to perform estimation of blood test values.

The combination of the type of input data and the type of output data is not limited to those described in the present example, and can be freely determined based on medical knowledge, background, or other information. For example, input data may be any one or more of color fundus image data, optical coherence tomography angiography image data, optical coherence tomography image data of other types such as morphological image data and/or functional image data, and data of other types. In addition, output data may be any one or more of a degree of severity of disease, a magnitude of the risk of aggravation, a numerical value of a test other than blood tests, and information of other types.

As described thus far, the technique and technology according to the present disclosure are capable of early detection of diseases that cause systemic vascular disorders and blood circulation disorders, by using a non-invasive modality to detect abnormalities that occur in microvessels and blood flow.

While certain embodiments have been described, these embodiments have been presented by way of example only, and are not intended to limit the scope of the inventions. Indeed, the novel embodiments described herein may be embodied in a variety of other forms; furthermore, various omissions, substitutions, additions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical system comprising:
    a data acquiring unit including an optical fundus imaging modality device configured to acquire data from an eye fundus of a patient using at least one optical method; and
    a data processor configured to process the data acquired by the data acquiring unit in order to generate information on a circulatory system of the patient;
    wherein the at least one optical method includes at least one of optical coherence tomography blood flow measurement (OCT blood flow measurement), optical coherence tomography angiography (OCT-A), and color fundus photography;
    wherein the at least one optical method includes the OCT blood flow measurement, and the data processor is configured to generate information on a blood coagulation and fibrinolytic system based at least on blood flow data acquired by the OCT blood flow measurement;
    wherein the data acquiring unit includes an OCT apparatus configured to collect time series data by repetitively applying OCT scanning to a predetermined region of the eye fundus, and a blood flow information generator including processing circuitry and configured to generate blood flow information that represents a spatial distribution of and a temporal change in blood flow velocity based at least on the time series data collected by the OCT apparatus, and the data processor is configured to generate information on the blood coagulation and fibrinolytic system based at least on the blood flow information generated by the blood flow information generator; and
    wherein the data processor includes a wall shear rate (WSR) information generator configured to generate WSR information that represents a spatial distribution of and a temporal change in a wall shear rate (WSR) based at least on the blood flow information.

2. The medical system according to claim 1, wherein the information on the circulatory system includes information on thrombophilia.

3. The medical system according to claim 2, wherein the information on the thrombophilia includes information on a blood characteristic.

4. The medical system according to claim 3, wherein the information on the blood characteristic includes information that represents a change in the blood characteristic caused by sthenia of a blood coagulation and fibrinolytic system.

5. The medical system according to claim 1, wherein the information on the circulatory system includes information on a thrombus symptom.

6. The medical system according to claim 5, wherein the information on the thrombus symptom includes information that represents a distribution of blood flow velocity in a blood vessel.

7. The medical system according to claim 5, wherein the information on the thrombus symptom includes information on an object formed in a blood vessel.

8. The medical system according to claim 1, wherein the information on the circulatory system includes information on a state of the circulatory system that accompanies an infectious disease.

9. The medical system according to claim 1, wherein the information on the circulatory system includes at least one of information that represents a state related to sepsis, information that represents a state related to disseminated intravascular coagulation (DIC), information that represents a state related to thrombus, and information that represents a state related to vascular occlusion.

10. The medical system according to claim 1, wherein
    the data acquiring unit includes
    an OCT apparatus configured to collect data by applying optical coherence tomography (OCT) scanning to the eye fundus, and
    a calculator including processing circuitry and configured to calculate blood flow velocity and blood vessel diameter based at least on the data collected by the OCT apparatus, and
    the data processor is configured to generate information on the blood coagulation and fibrinolytic system based at least on the blood flow velocity and the blood vessel diameter calculated by the calculator.

11. The medical system according to claim 10, wherein the data processor includes a WSR calculator configured to calculate a wall shear rate (WSR) based at least on the blood flow velocity and the blood vessel diameter.

12. The medical system according to claim 11, wherein the data processor further includes
    a memory that stores blood viscosity information acquired in advance, and a WSS calculator configured to calculate wall shear stress (WSS) based at least on the wall shear rate and the blood viscosity information.

13. The medical system according to claim 1, wherein the data processor is configured to generate information on an object formed in a blood vessel based at least on the blood flow information.

14. The medical system according to claim 1, wherein the data processor is configured to generate information on an object formed in a blood vessel based at least on the blood flow information and the WSR information.

15. The medical system according to claim 1, wherein the data processor further includes
a memory that stores blood viscosity distribution information acquired in advance, and
a WSS information generator configured to generate WSS information that represents a spatial distribution of and a temporal change in a wall shear stress (WSS) based at least on the WSR information and the blood viscosity distribution information.

16. The medical system according to claim 15, wherein the data processor is configured to generate information on an object formed in a blood vessel based at least on the blood flow information and the WSS information.

17. The medical system according to claim 1, wherein the data processor includes a first inference processor configured to execute inference processing using a first learned model, wherein
the first learned model is constructed by machine learning with first training data including first data acquired from an eye fundus using the at least one optical method and diagnosis result data, and
the first inference processor receives the data acquired from the eye fundus of the patient by the data acquiring unit and outputs the information on the circulatory system of the patient.

18. The medical system according to claim 1, wherein the data processor includes a second inference processor configured to execute inference processing using a second learned model, wherein
the second learned model is constructed by machine learning with second training data including second data generated by processing first data acquired from an eye fundus using the at least one optical method and diagnosis result data, and
the second inference processor receives data generated by processing the data acquired from the eye fundus of the patient by the data acquiring unit and outputs the information on the circulatory system of the patient.

19. The medical system according to claim 1, further comprising a transmitter configured to transmit the information on the circulatory system generated by the data processor to a doctor's computer terminal located at a place remote from the data acquiring unit.

20. A medical information processing apparatus comprising:
a data receiver configured to receive data acquired from an eye fundus of a patient using at least one optical method; and
a data processor configured to process the data received by the data receiver in order to generate information on the circulatory system of the patient;
wherein the at least one optical method includes at least one of optical coherence tomography blood flow measurement (OCT blood flow measurement), optical coherence tomography angiography (OCT-A), and color fundus photography;
wherein the at least one optical method includes the OCT blood flow measurement, and the data processor is configured to generate information on a blood coagulation and fibrinolytic system based at least on blood flow data acquired by the OCT blood flow measurement;
wherein the data acquiring unit includes an OCT apparatus configured to collect time series data by repetitively applying OCT scanning to a predetermined region of the eye fundus, and a blood flow information generator including processing circuitry and configured to generate blood flow information that represents a spatial distribution of and a temporal change in blood flow velocity based at least on the time series data collected by the OCT apparatus, and the data processor is configured to generate information on the blood coagulation and fibrinolytic system based at least on the blood flow information generated by the blood flow information generator; and
wherein the data processor includes a wall shear rate (WSR) information generator configured to generate WSR information that represents a spatial distribution of and a temporal change in a wall shear rate (WSR) based at least on the blood flow information.

* * * * *